(12) United States Patent
Takahashi et al.

(10) Patent No.: US 12,309,073 B2
(45) Date of Patent: May 20, 2025

(54) RECEIVING APPARATUS AND DATA PROCESSING METHOD

(71) Applicant: SATURN LICENSING LLC, New York, NY (US)

(72) Inventors: Kazuyuki Takahashi, Chiba (JP); Lachlan Bruce Michael, Saitama (JP)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 15/770,772

(22) PCT Filed: Nov. 29, 2016

(86) PCT No.: PCT/JP2016/085285
§ 371 (c)(1),
(2) Date: Apr. 25, 2018

(87) PCT Pub. No.: WO2017/098950
PCT Pub. Date: Jun. 15, 2017

(65) Prior Publication Data
US 2018/0324102 A1    Nov. 8, 2018

(30) Foreign Application Priority Data

Dec. 10, 2015  (JP) ................. 2015-241210

(51) Int. Cl.
*H04L 47/32* (2022.01)
*H04H 20/18* (2008.01)
(Continued)

(52) U.S. Cl.
CPC ............ *H04L 47/32* (2013.01); *H04H 20/18* (2013.01); *H04L 5/001* (2013.01); *H04W 4/06* (2013.01); *H04N 21/434* (2013.01); *H04W 92/16* (2013.01)

(58) Field of Classification Search
CPC ...... H03C 3/40; H04B 1/0475; H04B 1/7117; H03L 7/0814; H03L 7/093; G01S 5/14;
(Continued)

(56) References Cited

U.S. PATENT DOCUMENTS 5,907,582 A    5/1999 Yi
5,970,085 A   10/1999 Yi
(Continued)

FOREIGN PATENT DOCUMENTS

CN    102017476 A    4/2011
CN    102291233     12/2011
(Continued)

OTHER PUBLICATIONS

International Search Report issued Feb. 21, 2017 in PCT/JP2016/085285, 2 pages.
(Continued)

*Primary Examiner* — Guang W Li
(74) *Attorney, Agent, or Firm* — Chris Kolefas

(57) ABSTRACT

The present technology relates to a receiving apparatus and a data processing method that can execute delay compensation with more simplified configuration.
A receiving apparatus has a delay compensation block configured to delay, on the basis of time information included in a packet to be transmitted for each of a plurality of transmission paths including a broadcasting path, another packet to be transmitted by other transmission path than the reference transmission path with respect to a reference packet to be transmitted by a reference transmission path among the plurality of transmission paths to compensate a delay between the packets to be transmitted for each of the plurality of transmission paths. The present technology can be applied to television receivers having a channel bonding function, for example.

20 Claims, 19 Drawing Sheets

(51) Int. Cl.
  *H04L 5/00* (2006.01)
  *H04W 4/06* (2009.01)
  *H04N 21/434* (2011.01)
  *H04W 92/16* (2009.01)
(58) Field of Classification Search
  CPC ........ G01S 19/09; G01S 19/11; G01S 19/254;
    G01S 2205/008; G11C 2207/2254; G11C
    7/1066; G11C 7/1072; H03F 1/3294;
    H04L 27/368; H04L 47/32; H04L 7/00;
    H04L 7/04; G06F 2221/2111; H04J 3/06;
    H04N 21/434; H04W 4/06; H04W 92/16
  See application file for complete search history.

(56) References Cited

U.S. PATENT DOCUMENTS

| | | | |
|---|---|---|---|
| 6,061,387 A | 5/2000 | Yi | |
| 10,187,279 B2 | 1/2019 | Ishii et al. | |
| 10,211,941 B2 | 2/2019 | Ruffini et al. | |
| 2010/0315986 A1* | 12/2010 | Lee | H04W 8/04 |
| | | | 370/312 |
| 2011/0037904 A1* | 2/2011 | Yokokawa | H04N 21/4346 |
| | | | 375/316 |
| 2011/0051754 A1* | 3/2011 | Lansdowne | H04J 3/0697 |
| | | | 370/503 |
| 2011/0150476 A1* | 6/2011 | Zhao | H04J 3/0655 |
| | | | 398/63 |
| 2012/0087252 A1 | 4/2012 | Ansorge et al. | |
| 2012/0263263 A1* | 10/2012 | Olsen | H04L 67/16 |
| | | | 375/354 |
| 2013/0044840 A1* | 2/2013 | Yamamoto | H04H 20/22 |
| | | | 375/340 |
| 2014/0036681 A1* | 2/2014 | Kamerkar | H04L 43/0888 |
| | | | 370/235 |
| 2015/0030100 A1* | 1/2015 | Hwang | H04L 1/0083 |
| | | | 375/295 |
| 2015/0071153 A1* | 3/2015 | Hong | H04L 5/0023 |
| | | | 370/312 |
| 2016/0164710 A1 | 6/2016 | Hwang et al. | |
| 2016/0182976 A1* | 6/2016 | Kwon | H04L 69/22 |
| | | | 725/118 |
| 2016/0191679 A1* | 6/2016 | Hwang | H04L 69/22 |
| | | | 375/340 |
| 2016/0205158 A1* | 7/2016 | Lo | H04L 65/60 |
| | | | 709/219 |
| 2016/0212457 A1* | 7/2016 | Kwon | H04N 21/2385 |
| 2016/0315991 A1* | 10/2016 | Oh | H04N 21/6437 |
| 2016/0337486 A1* | 11/2016 | Kwon | H04N 21/4381 |
| 2016/0337672 A1* | 11/2016 | Lee | H04N 21/236 |
| 2017/0063494 A1* | 3/2017 | Loghin | H04L 1/0045 |
| 2017/0064655 A1* | 3/2017 | Jalloul | H04B 7/0871 |
| 2018/0076997 A1 | 3/2018 | Hwang et al. | |
| 2018/0213270 A1* | 7/2018 | Ng | H04N 21/4305 |

FOREIGN PATENT DOCUMENTS

| | | |
|---|---|---|
| CN | 102714559 | 10/2012 |
| CN | 104040442 | 9/2014 |
| JP | 2003-234726 A | 8/2003 |
| JP | 2005-252919 A | 9/2005 |
| JP | 2011-101106 A | 5/2011 |
| KR | 20120032545 | 4/2012 |
| WO | WO 02/05446 A1 | 1/2002 |
| WO | WO 2008/075608 A1 | 6/2008 |

OTHER PUBLICATIONS

MMT-Based Media Transport Scheme in Digital Broadcasting Systems, ARIB STD-B60 ver.1.0, Association of Radio Industries and Businesses, Jul. 31, 2014, pp. 29-38.
ATSC Candidate Standard: Physical Layer Protocol, Doc. S32-230r21, Advanced Television Systems Committee, Sep. 28, 2015, pp. 1-228.
Extended European Search Report issued Dec. 10, 2018 in corresponding European Patent Application No. 16872850.9, 9 pages.
Wang et al., VPN Network Technology and Service Application, May 31, 2012, Text 169-170, with English translation.

* cited by examiner

FIG.6

| OFI | Description |
|---|---|
| 00 | No Extension Mode:<br>Absence of both optional and extension fields |
| 01 | Short Extension Mode:<br>Presence of the optional field,<br>with length equal to 1byte. |
| 10 | Long Extension Mode:<br>Presence of the optional field,<br>with length equal to 2bytes. |
| 11 | Mixed Extension Mode:<br>Presence of the optional field,<br>with length equal to 2bytes. |

OFI description

FIG. 7

EXT_TYPE field description for Extension mode

| EXT_TYPE | Description |
|---|---|
| 000 | Counter<br>A counter as defined in Section 5.2.2.3.1 shall be used |
| 001-110 | These fields are reserved for future extension types |
| 111 | Padding<br>All bytes of extension field are padded with 0x00h as defined in Section 5.2.2.3.2. |

A

FIG.11
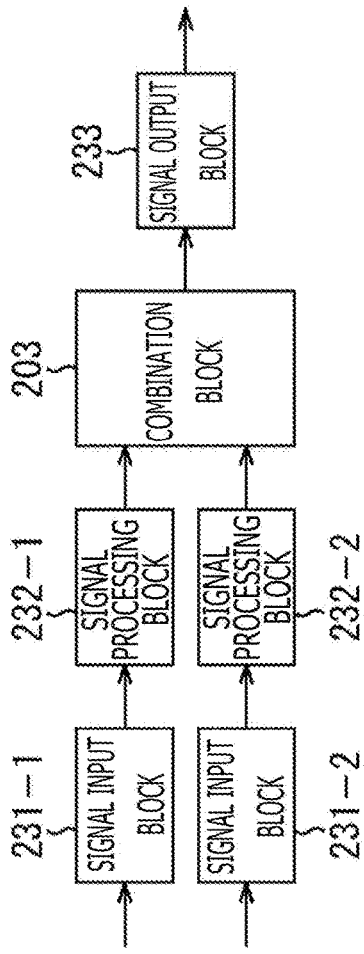
A. RELATED-ART SCHEME 1
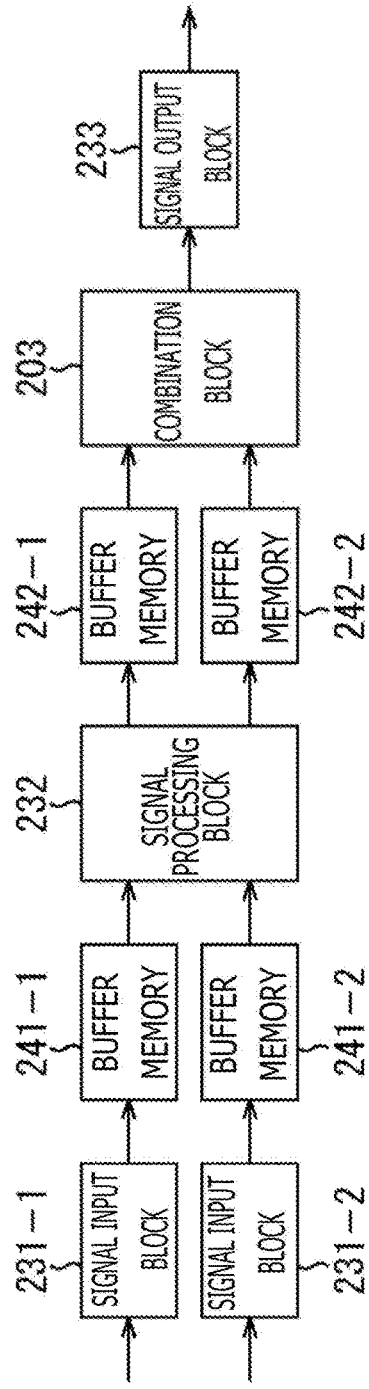
B. RELATED-ART SCHEME 2

RECEIVING APPARATUS AND DATA PROCESSING METHOD

TECHNICAL FIELD

The present technology relates to a receiving apparatus and a data processing method and, more particularly to a receiving apparatus and a data processing method that are set up to execute delay compensation with a more simplified configuration.

BACKGROUND ART

In digital broadcasting, channel bonding is known in which two or more channels are linked with each other for use. In addition, also in the next generation ATSC (Advanced Television Systems Committee) standard called ATSC3.0, the employment of channel bonding is expected (refer to NPL 1, for example).

CITATION LIST

Non Patent Literature

[NPL 1]
ATSC Candidate Standard: Physical Layer Protocol (Doc. S32-230r21 28 Sep. 2015)

SUMMARY

Technical Problems

Incidentally, in the data transmission based on the broadcasting scheme such as ATSC3.0, the broadcast wave (the electromagnetic wave) sent from sending facilities (sending stations) causes a propagation delay in accordance with a distance between a sending point and a receiving point; if channel bonding is employed, the broadcast waves sent from different sending facilities have different amounts of propagation delay in accordance with a distance up to a receiving point.

In such a situation, it is necessary for a receiver to execute delay compensation for the prevention of erroneous operations; therefore, it is desired to design a circuit of executing the delay compensation to have a more simplified configuration. Hence, propositions for executing delay compensation with more simplified configurations have been called for.

Therefore, the present technology has been devised in light of the above circumstances, and it is an object of the present technology to permit executing delay compensation with more simplified configuration.

Solution to Problems

According to one aspect of the present technology, there is provided a receiving apparatus. This receiving apparatus has a delay compensation block configured to delay, on the basis of time information included in a packet to be transmitted for each of a plurality of transmission paths including a broadcasting path, another packet to be transmitted by other transmission path than the reference transmission path with respect to a reference packet to be transmitted by a reference transmission path among the plurality of transmission paths to compensate a delay between the packets to be transmitted for each of the plurality of transmission paths.

The receiving apparatus according to one aspect of the present technology may be a discrete unit or one block internal to one apparatus. Further, the data processing method according to one aspect of the present technology is a data processing method corresponding to the above-mentioned receiving apparatus according to one aspect of the present technology.

In the receiving apparatus and the data processing method according to one aspect of the present technology, on the basis of time information included in a packet to be transmitted for each of a plurality of transmission paths including a broadcasting path, another packet to be transmitted by other transmission path than the reference transmission path is delayed with respect to a reference packet to be transmitted by a reference transmission path among the plurality of transmission paths to compensate a delay between the packets to be transmitted for each of the plurality of transmission paths.

Advantageous Effects of Invention

According to one aspect of the present technology, delay compensation can be executed with more simplified configuration.

It should be noted that the effects described above are not always restricted thereto; therefore, any effects described herein can hold true.

BRIEF DESCRIPTION OF DRAWINGS

FIG. 6 is a diagram for describing an OFI value.

FIG. 7 is a diagram for describing an EXT_TYPE value.

FIG. 11 is a diagram illustrating a configuration of a related-art scheme.

DESCRIPTION OF EMBODIMENT

Figure 1:
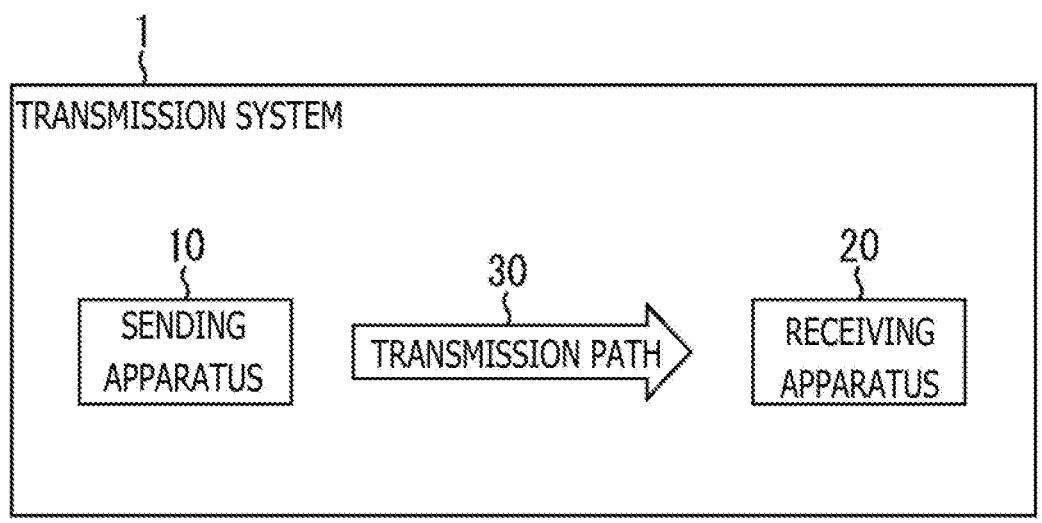
FIG. 1 is a diagram illustrating a configuration of one embodiment of a transmission system to which the present technology is applied.

The following describes embodiment of the present technology with reference to drawings. It should be noted that the description will be done in the following sequence:
1. System configuration
2. Overview of channel bonding
3. Delay compensation of present technology
   (1) Delay compensation of channel bonding
   (2) Delay compensation in cooperation of broadcasting and communication
   (3) Delay compensation in case where time is shifted for each sending facility
4. Flow of delay compensation processing on receiving side
5. Modifications
6. Computer configuration 1. System Configuration (Exemplary Configuration of Transmission System)

FIG. 1 is a diagram illustrating a configuration of one embodiment of a transmission system to which the present technology is applied. It should be note that a system refers to a logical aggregation of two or more apparatuses.

In FIG. 1, a transmission system 1 includes a sending apparatus 10 and a receiving apparatus 20. With this transmission system 1, data transmission compliant with a broadcasting scheme (a digital broadcasting standard) such as ATSC3.0 is performed.

The sending apparatus 10 that is a sending machine compliant with a broadcasting scheme such as ATSC3.0 sends (transmits) content via a transmission path 30. For example, the sending apparatus 10 sends a broadcast stream that includes the video and audio (a component thereof) included in content such as a broadcast program and signaling via the transmission path 30 as broadcast waves (electromagnetic waves).

The receiving apparatus 20 that is a receiving machine compliant with a broadcasting scheme such as ATSC3.0 receives content transmitted from the sending apparatus 10 via the transmission path 30 and outputs the received content. For example, the receiving apparatus 20 receives broadcast waves (electromagnetic waves) from the sending apparatus 10 and processes the video and audio (a component thereof) included in the content and the signaling that are included in the broadcast stream, thereby reproducing the video and audio of the content such as a broadcast program.

It should be noted that, in the transmission system 1, the transmission path 30 may be, for example, satellite broadcasting using a BS (Broadcasting Satellite) or a CS (Communication Satellite) or a wired broadcasting (CATV) using a cable in addition to terrestrial broadcasting (terrestrial-wave broadcasting).

2. Overview of Channel Bonding (Concept of Channel Bonding)

Figure 2:
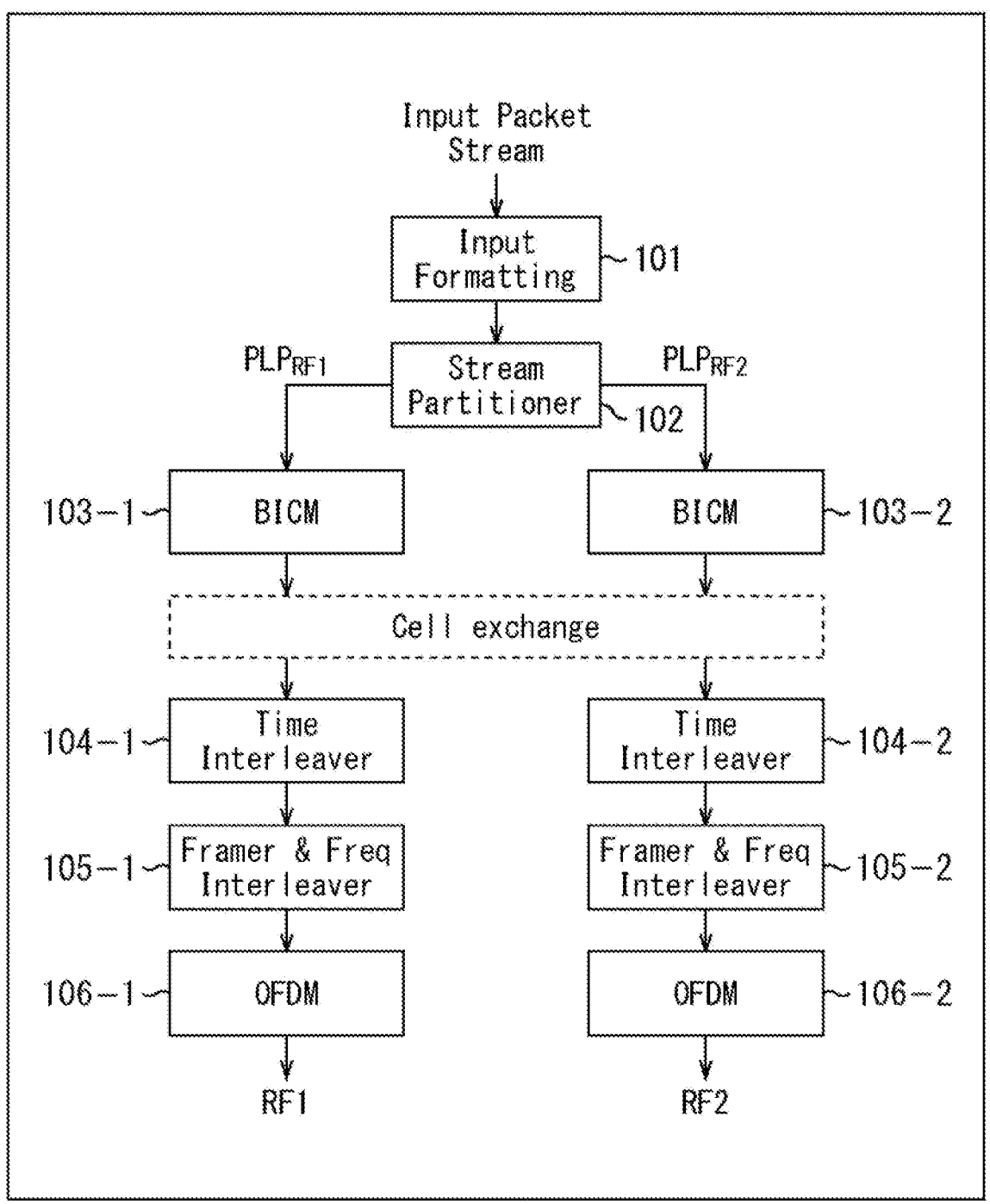
FIG. 2 is a diagram illustrating a concept of channel bonding.

FIG. 2 is a diagram illustrating a concept of channel bonding.

In digital broadcasting, channel bonding that uses two or more channels (frequency bands) by linking these channels is known. For example, in the DVB-C2 (Digital Video Broadcasting-Cable second generation) standard, PLP bundling is specified as one of the channel bonding schemes. In addition, also in ATSC3.0, one of the next-generation broadcasting schemes, the employment of channel bonding is anticipated.

Use of this channel bonding allows an operation such that a stream of high data rate is divided into two or more (channels of) streams before being transmitted on the sending side, while the two or more divided streams are restored (recombined) into the stream of the original data rate on the receiving side, for example.

It should be noted that it is supposed with ATSC3.0 that services of higher sophistication be provided by introducing an IP transmission scheme in which IP (Internet Protocol) packets used in the field of communication is used in digital broadcasting rather than the currently widely used MPEG2-TS (Transport Stream) scheme as a transmission scheme.

In FIG. 2, an input formatting 101 executes necessary processing on an input stream (Input Packet Stream) entered therein and distributes the packets storing the data obtained as a result of that processing to a PLP (Physical Layer Pipe). The data processed by the input formatting 101 is outputted to a stream partitioner 102.

The stream partitioner 102 distributes the data for each PLP entered from the input formatting 101 to each RF channel and outputs the distributed data to a BICM (Bit Interleaved Coding and Modulation) processing block 103 according to each RF channel line. In this example, channel bonding is executed by use of two channels, RF channel 1 and RF channel 2, so that the data of $PLP_{RF1}$ that is transmitted by the RF channel 1 is outputted to a BICM processing block 103-1 and the data of $PLP_{RF2}$ that is transmitted by the RF channel 2 is outputted to a BICM processing block 103-2.

The BICM processing block 103-1 executes error correction processing, bit interleaving, quadrature modulation, and the like on the data of $PLP_{RF1}$ from the stream partitioner 102. The data processed by the BICM processing block 103-1 is outputted to a time interleaver 104-1.

The time interleaver 104-1 executes the processing of interleaving in a time direction on the data entered from the BICM processing block 103-1. The data processed by the time interleaver 104-1 is outputted to a frame & frequency interleaver 105-1.

The frame & frequency interleaver 105-1 executes the processing of generating a physical layer frame and interleaving in a frequency direction on the data entered from the time interleaver 104-1. The data processed by the frame & frequency interleaver 105-1 is supplied to an OFDM processing block 106-1.

The OFDM processing block 106-1 processes the data entered from the frame & frequency interleaver 105-1 to generate an OFDM (Orthogonal Frequency Division Multiplexing) signal corresponding to the physical layer frame and sends the generated signal via the transmission path 30 by a broadcast wave including the RF channel 1 (RF1).

In addition, the BICM processing block 103-2 through the OFDM processing block 106-2 have similar functions to those of the above-mentioned BICM processing block 103-1 through the OFDM processing block 106-1. In the BICM processing block 103-2 through the OFDM processing block 106-2, the processing on the data of $PLP_{RF2}$ from the stream partitioner 102 is executed to generate an OFDM signal corresponding to the data of $PLP_{RF2}$, the generated signal being sent via the transmission path 30 by a broadcast wave including the RF channel 2 (RF2).

As described above, data transmission can be realized by use of two or more channels such as the RF channel 1 (RF1) and the RF channel 2 (RF2) by channel bonding. Next, with reference to FIG. 3 and FIG. 4, the channel bonding processing to be executed on the sending side and the receiving side will be described.

(Channel Bonding Processing on Sending Side)

Figure 3:
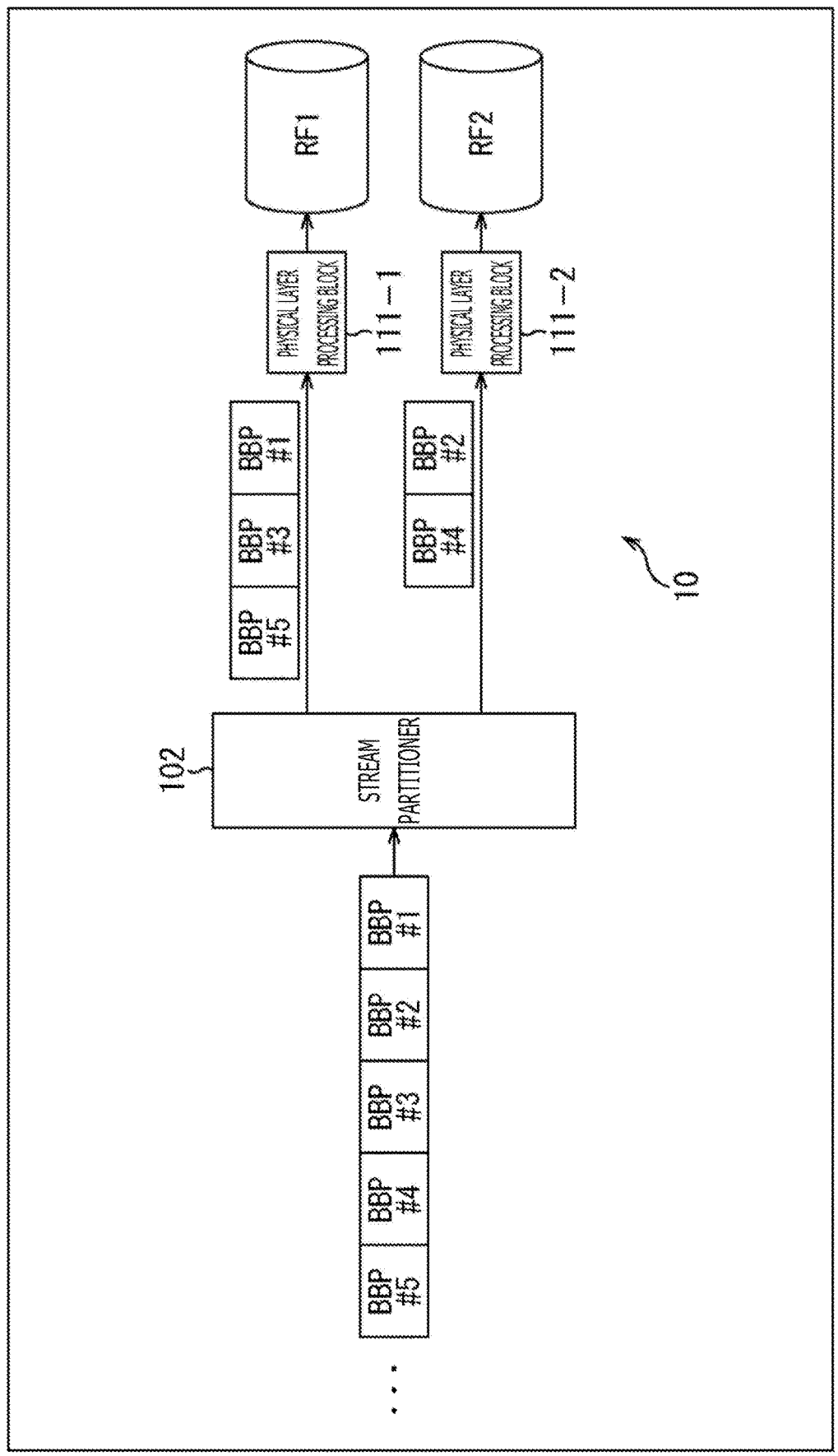
FIG. 3 is a diagram illustrating the processing of channel bonding to be executed on the sending side.

FIG. 3 is a diagram illustrating the channel bonding processing to be executed in the sending apparatus 10.

In FIG. 3, the stream partitioner 102 distributes the BB (Baseband) packets (hereafter referred to also as BBP (Baseband Packet)) entered from the input formatting 101 to a physical layer processing block 111-1 according to the line of the RF channel 1 (RF1) and a physical layer processing block 111-2 according to the line of the RF channel 2 (RF2).

If BBP#1, BBP#2, BBP#3, BBP#4, BBP#5, . . . are entered in this sequence, for example, the stream partitioner 102 outputs BBP#1, BBP#3, BBP#5, . . . to the physical layer processing block 111-1 and BBP#2, BBP#4, . . . to the physical layer processing block 111-2. However, the extension header of each BB packet includes a BBP counter indicative of the sequence of each BB packet. It should be noted that details of the BBP counter will be described later with reference to FIG. 5 through FIG. 7.

The physical layer processing block 111-1, equivalent to the BICM processing block 103-1 through the OFDM processing block 106-1 illustrated in FIG. 2, executes the physical layer processing related with the physical layer. This physical layer processing generates an OFDM signal corresponding to a physical layer frame through the execution of error correction processing, bit interleaving, quadrature modulation, or the interleaving in the time direction or the frequency direction, the generated signal being sent by a broadcast wave including the RF channel 1 (RF1).

The physical layer processing block 111-2, equivalent to the BICM processing block 103-2 through the OFDM processing block 106-2 illustrated in FIG. 2, executes the physical layer processing related with the physical layer, a resultant OFDM signal corresponding to a physical layer frame being sent by a broadcast wave including the RF channel 2 (RF2).

As described above, in the sending apparatus 10, executing channel bonding processing allows the division of a target input stream into two or more divided streams so as to transmit these two or more divided streams by use of two or more channels such as the RF channel 1 (RF1) and the RF channel 2 (RF2).

(Channel Bonding Processing on Receiving Side)

Figure 4:
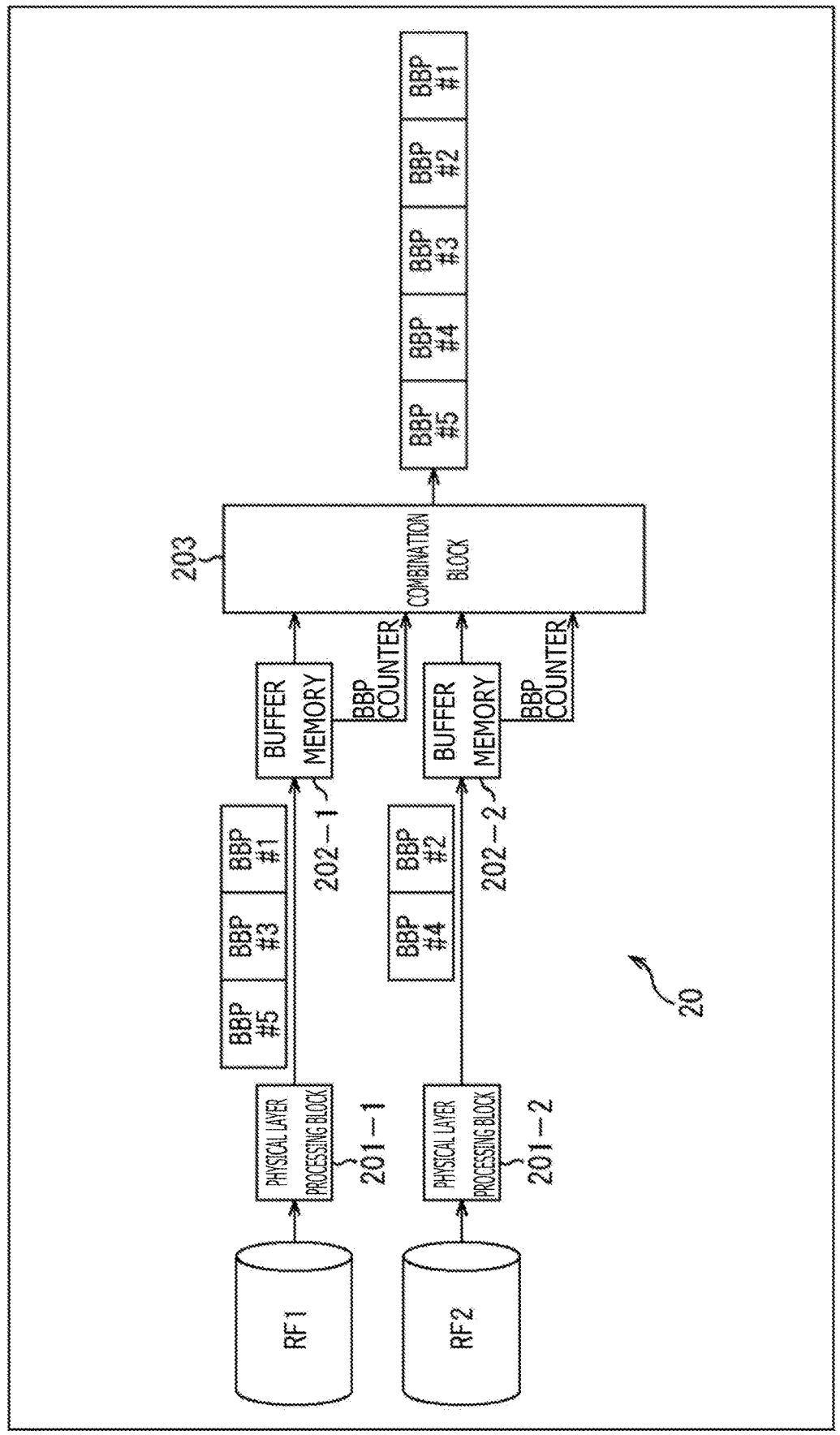
FIG. 4 is a diagram illustrating the processing of channel bonding to be executed on the receiving side.

FIG. 4 is a diagram illustrating the channel bonding processing to be executed in the receiving apparatus 20.

In the receiving apparatus 20, an OFDM signal transmitted by a broadcast wave including the RF channel 1 (RF1) from the sending apparatus 10 is received to be entered in a physical layer processing block 201-1. In addition, in the receiving apparatus 20, an OFDM signal transmitted by a broadcast wave including the RF channel 2 (RF2) from the sending apparatus 10 is received to be entered in the physical layer processing block 201-2.

The physical layer processing block 201-1 executes the physical layer processing related with the physical layer on the OFDM signal transmitted by a broadcast wave including the RF channel 1 (RF1). Executing this physical layer processing allows the extraction of BB packets through the execution of the processing related with a physical layer frame, the deinterleaving in the frequency direction or the time direction, quadrature demodulation, bit deinterleaving, or error correction processing. The BBP#1, BBP#3, BBP#5, . . . extracted by the physical layer processing block 201-1 are held in a buffer memory 202-1 in this sequence.

The physical layer processing block 201-2 executes the physical layer processing on an OFDM signal transmitted by a broadcast wave including the RF channel 2 (RF2) and holds BBP#2, BBP#4, . . . extracted by this physical layer processing in a buffer memory 202-2 in this sequence.

The buffer memory 202-1 stores BBP#1, BBP#3, BBP#5, . . . in this sequence and the buffer memory 202-2 stores BBP#2, BBP#4, . . . in this sequence. Here, the extension header of each BB packet includes a BBP counter indicative of the sequence of the BB packet, this BBP counter being supplied to a combination block 203 with each BB packet. It should be noted that details of the BBP counter will be described later with reference to FIG. 5 through FIG. 7.

By following the BB counter, the combination block 203 reads BB packets from the buffer memory 202-1 or the buffer memory 202-2 and outputs the BB packets. For example, by following the BB counter, the combination block 203 alternately reads BB packets from the buffer memory 202-1 holding BBP#1, BBP#3, BBP#5, . . . and the buffer memory 202-2 holding BBP#2, BBP#4, . . . , thereby outputting BBP#1, BBP#2, BBP#3, BBP#4, BBP#5, . . . in this sequence.

It should be noted that the sequence in which BB packets are outputted depends on the parameters of physical layer or the installation of the sending apparatus 10 and the receiving apparatus 20, for example; however, use of the BBP counter included in the extension header of each BB packet allows the rearrangement of the BB packets in a correct sequence. Here, the parameters of physical layer include parameters that are set when the interleaving in the time direction is executed by the time interleaver 104 (FIG. 2), for example.

As described above, in the receiving apparatus 20, the execution of the channel bonding processing allows the restoration (recombination) of the original stream from two or more divided streams transmitted by use of two or more channels such as the RF channel 1 (RF1) and the RF channel 2 (RF2).

It should be noted that, in the above description, the channel bonding by two RF channels, the RF channel 1 (RF1) and the RF channel 2 (RF2) has been explained for the brevity of description; however, it is also practicable to execute channel bonding that uses three or more RF channels rather than two. Also, in the following description, it is assumed that the above-mentioned physical layer frame be also referred to as a broadcast packet (a physical layer packet). However, this broadcast packet also denotes a packet that is transmitted along a broadcasting path in addition to a physical layer packet (a packet that is processed on the physical layer).

(Configuration of BBP Counter)

Figure 5:
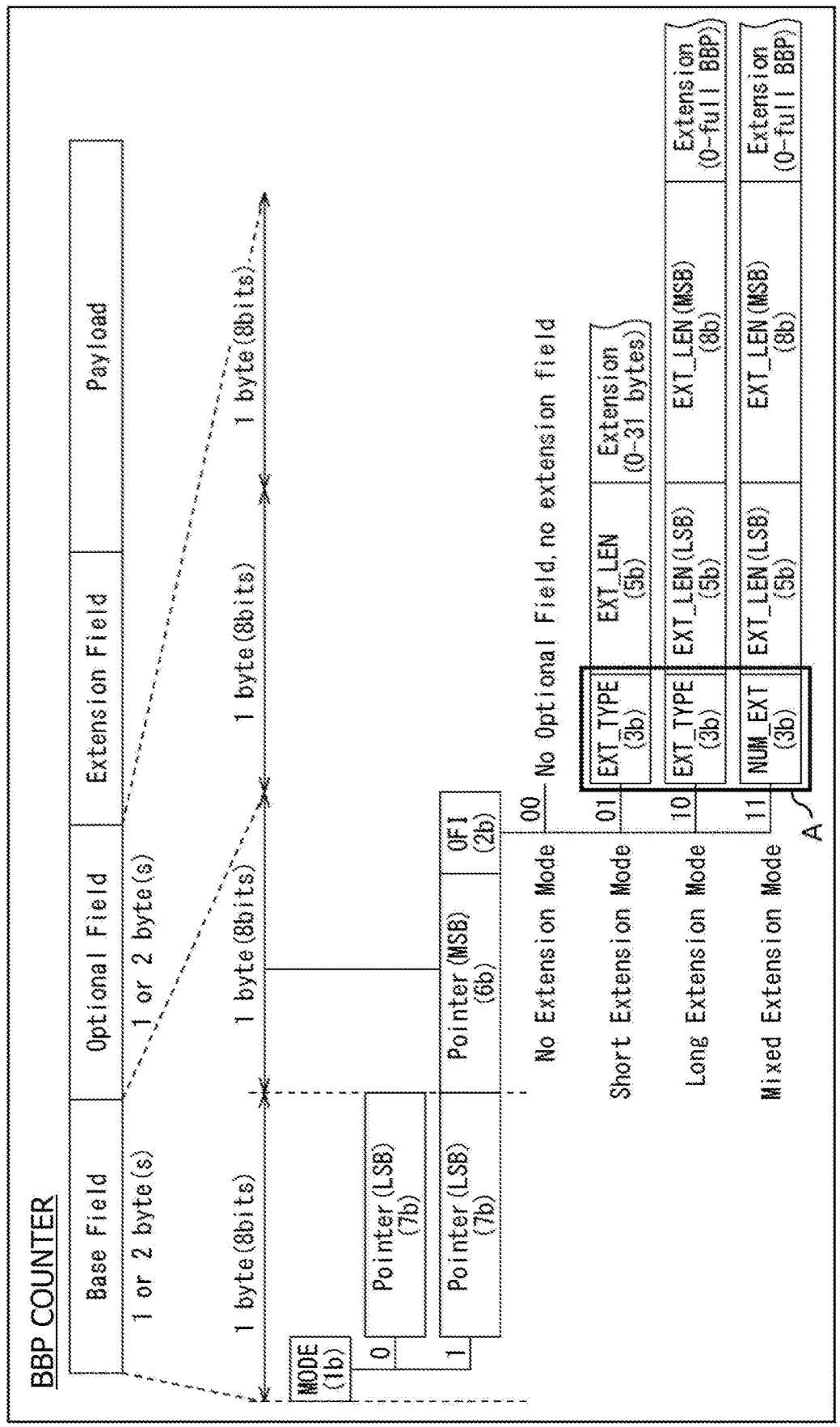
FIG. 5 is a diagram illustrating an example of the arrangement of a BBP counter.

Here, the following describes a configuration of the BBP counter with reference to FIG. 5 through FIG. 7.

FIG. 5 illustrates a configuration of a BB packet (BBP: Baseband Packet). In FIG. 5, a BB packet includes a BBP header and a payload (Payload). In the BBP header, an optional field (Optional Field) and an extension field (Extension Field) can be arranged in addition to a base field (Base Field) of one or two bytes.

That is, in the base field, if "0" is set for a 1-bit mode (MODE), 7-bit pointer information (Pointer (LSB)) is arranged. It should be noted that the pointer information is information indicative of the position of an ALP (ATSC Link-layer Protocol) packet arranged in the payload of a BB packet.

Also, if "1" is set as the mode (MODE), 7-bit pointer information (Pointer (LSB)), 6-bit pointer information (Pointer (MSB)), and 2-bit optional field flag (OFI) are arranged. The optional field flag (OFI) is information indicative of whether to extend the header by arranging an optional field (Optional Field) and an extension field (Extension Field).

That is, as illustrated in FIG. 6, if the extension of an optional field and an extension field is not executed, then "00" is set to the optional field flag (OFI), thereby providing no-extension mode (No Extension Mode). If the extension of a 1-byte optional field and a 0- to 31-byte extension field is executed, "01" is set to the optional field flag (OFI), thereby providing a short extension mode (Short Extension Mode).

If the extension of a 2-byte optional field and an extension field of any number of bytes is executed, "10" or "11" is set to the optional field flag (OFI), thereby providing a long extension mode (Long Extension Mode) or a mixed extension mode (Mixed Extension Mode).

Returning to FIG. 5, in the case of the short extension mode here, 3-bit extension type information (EXT_TYPE) is set to the beginning of the optional field ("A" in FIG. 5). As illustrated in FIG. 7, if "000" is set as this extension type information, then a BBP counter (Counter) according to the number of bytes set in 5-bit extension length information (EXT_LEN) is arranged to the extension field (Extension Field) ("A" illustrated in FIG. 7).

In addition, in the case of the long extension mode or the mixed extension mode, 3-bit extension type information (EXT_TYPE) or extension number information (NUM_EXT) is set to the beginning of the optional field ("A" in FIG. 5). If "000" is set as this extension type information or the extension number information, a BBP counter (Counter) according to the number of bytes set in 13-bit extension length information (EXT_LEN) is arranged to the extension field (Extension) ("A" in FIG. 7).

As described above, a BBP counter indicative of the sequence of BB packets can be included in the extension header of each BB packet (the extension field (Extension Field) of the BBP header).

3. Delay Compensation of Present Technology (1) Delay Compensation of Channel Bonding
(Propagation Delay in Channel Bonding)

Figure 8:
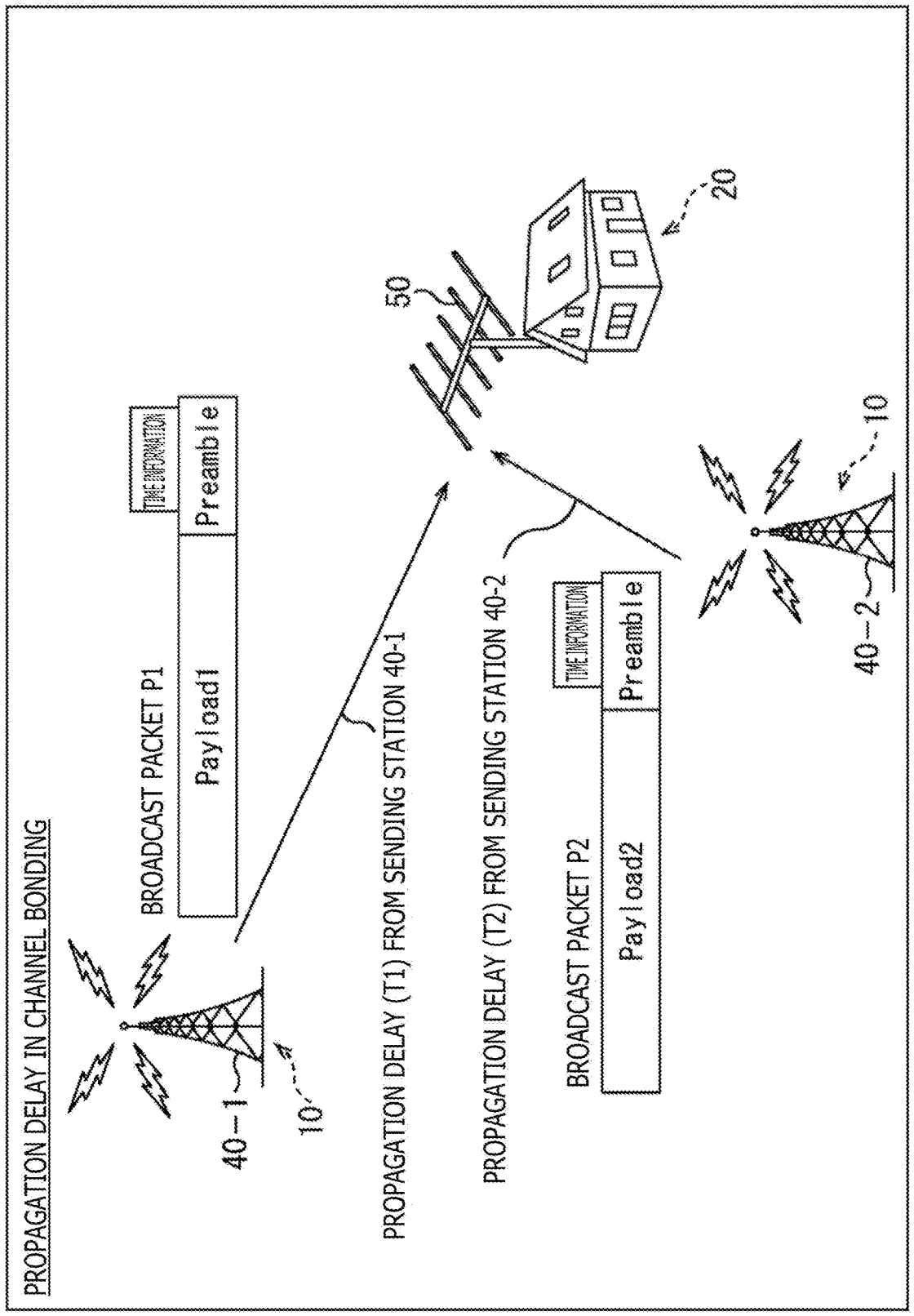
FIG. 8 is a diagram for describing an overview of the propagation delay of channel bonding.

FIG. 8 is a diagram for describing an overview of the propagation delay in channel bonding.

FIG. 8 schematically illustrates a manner in which an input stream is divided by the sending apparatus 10 of a broadcasting station into two divided streams so as for a broadcast wave (an electromagnetic wave) including the OFDM signals of these streams to be each sent from a sending station 40-1 and a sending station 40-2. It should be noted that, in FIG. 8, the sending station 40-1 and the sending station 40-2 are sending facilities installed at different places.

The broadcast wave (the broadcast wave including the RF channel 1) sent (transmitted) from the sending station 40-1 and the broadcast wave (the broadcast wave including the RF channel 2) sent (transmitted) from the sending station 40-2 are received by an antenna 50 installed at each house to be processed by the receiving apparatus 20 (a television receiver, for example) installed inside the house.

That is, the receiving apparatus 20 processes the packets (hereafter also referred to as broadcast packets P1) transmitted by the broadcast wave from the sending station 40-1 and the packets (hereafter also referred to as broadcast packets P2) transmitted by the broadcast wave from the sending station 40-2 so as to restore (recombines) the original stream from the two divided streams.

Here, with the broadcast waves sent from the sending facilities such as the sending station 40-1 and the sending station 40-2, propagation delays are caused in accordance with distances from the sending points from which the broadcast waves are sent to the receiving points at which the broadcast waves are received. In FIG. 8, since the distance from the sending station 40-1 (the sending point thereof) to the antenna 50 (the receiving point thereof) differs from the distance from the sending station 40-2 (the sending point thereof) to the antenna 50 (the receiving point thereof), the propagation delay amounts are different for the broadcast waves sent from the different sending stations.

That is, since the broadcast waves sent from two or more sending points are received by a same receiving point, the broadcast packets received at the receiving apparatus 20 have different propagation delay amounts for different transmission paths. Then, in the receiving apparatus 20, even if the broadcast packets having these different propagation delay amounts are processed, the original stream cannot be correctly restored (recombined) from two or more divided streams. Therefore, the propagation delays described above need to be compensated.

Accordingly, in the present technology, it is configured that time information is added to each broadcast packet storing the data of divided streams to be transmitted for two or more transmission paths and, by use of this time information, a difference value between the propagation delay amounts for the transmission paths is measured, thereby compensating the propagation delay.

For example, in FIG. 8, the broadcast packet P1 transmitted by the broadcast wave from the sending station 40-1 includes a payload (Payload1) and a preamble (Preamble), so that it is set up that time information is included in this preamble. Likewise, the broadcast packet P2 transmitted by the broadcast wave from the sending station 40-2 includes a payload (Payload2) and a preamble (Preamble), so that it is set up that time information is also included in this preamble.

Figure 9:
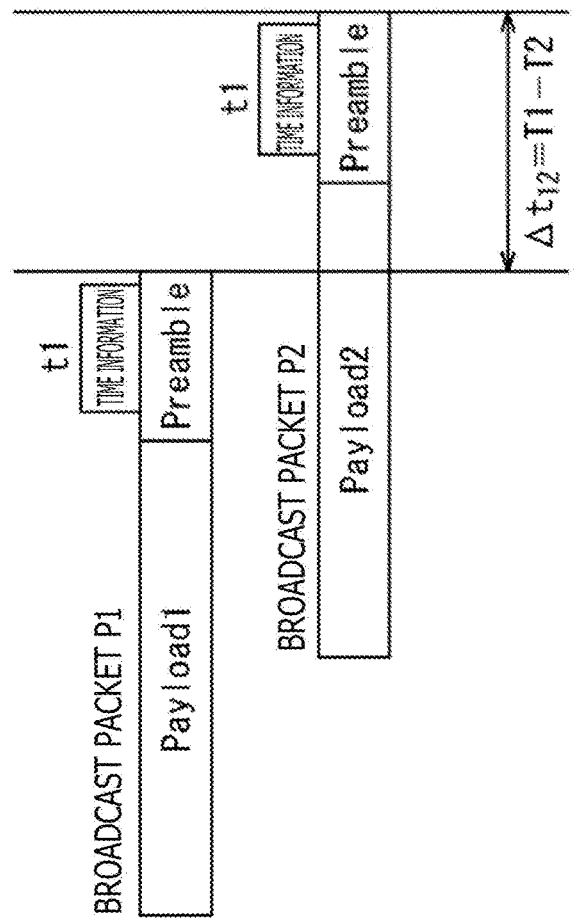
FIG. 9 is a diagram for describing an influence of the propagation delay of channel bonding.

Here, as illustrated in FIG. 9, since there is a difference in the propagation delay amount between the broadcast packet P1 transmitted by the broadcast wave from the sending station 40-1 and the broadcast packet P2 transmitted by the broadcast wave from the sending station 40-2, the timings at which these broadcast packets are entered (received) are different in the receiving apparatus 20. In FIG. 9, the broadcast packet P2 transmitted by the broadcast wave from the sending station 40-2 is entered (received) before the broadcast packet P1 transmitted by the broadcast wave from the sending station 40-1.

At this moment, the difference ($\Delta t_{1,2}$) in time between the beginnings of the broadcast packet P1 and the broadcast packet P2 entered (received) at different timings is equivalent to the difference (T1−T2) between time T1 of the propagation delay in the broadcast wave sent from the sending station 40-1 and time T2 of the propagation delay in the broadcast wave sent from the sending station 40-2. Then, if the difference ($\Delta t_{12}$) in the time between these broadcast packets becomes 0, the difference (T1−T2) between time T1 of propagation delay and time T2 of propagation delay also becomes 0, consequently enabling the compensation of the propagation delay amounts that are different for the different transmission paths.

Further, the preambles of the broadcast packet P1 and the broadcast packet P2 include time information that is indicative of a time at which a target broadcast packet is sent from the sending apparatus 10, namely, a time (an absolute time) at which the target packet is sent from the sending station 40-1 or the sending station 40-2. In this example, the preamble of the broadcast packet P1 transmitted by the broadcast wave from the sending station 40-1 and the preamble of the broadcast packet P2 transmitted by the broadcast wave from the sending station 40-2 each include the time information indicative of the same time t1.

Therefore, in the receiving apparatus 20 in which the broadcast waves sent from the sending station 40-1 and the sending station 40-2 are received via the antenna 50, the propagation delay amounts that are different for the different transmission paths can be compensated by eliminating the delay (the delay between the broadcast packet P1 and the broadcast packet P2 illustrated in FIG. 9) between the broadcast packets each having the time information indicative of the same time t1. Then, in the receiving apparatus 20, processing the broadcast packets with this propagation delay amount compensated can correctly restore (recombine) the original stream from the two or more divided streams.

As described above, in the present technology, in order to eliminate the delay between the broadcast packets having the time information indicative of the same time, these broadcast packets being transmitted for two or more transmission paths, the broadcast packet (the broadcast packet P2 illustrated in FIG. 9, for example) entered (received) first is delayed until the broadcast packet (the broadcast packet P1 illustrated in FIG. 9, for example) is subsequently entered (received), thereby eliminating the delay (the delay between the broadcast packet P1 and the broadcast packet P2 illustrated in FIG. 9, for example) between these packets (the delay is reduced to 0).

In other words, here, with the broadcast packet P1 that is latest selected as the reference packet from among the broadcast packets having the time information indicative of the same time, these broadcast packets being transmitted for two or more transmission paths, the other packet (the broadcast packet P2) is delayed. This setup allows, in the receiving apparatus 20, the compensation of the propagation delay amounts that are different for the two or more different transmission paths including the broadcasting path.

(Exemplary Configuration of Propagation Delay Compensation Block)

Figure 10:
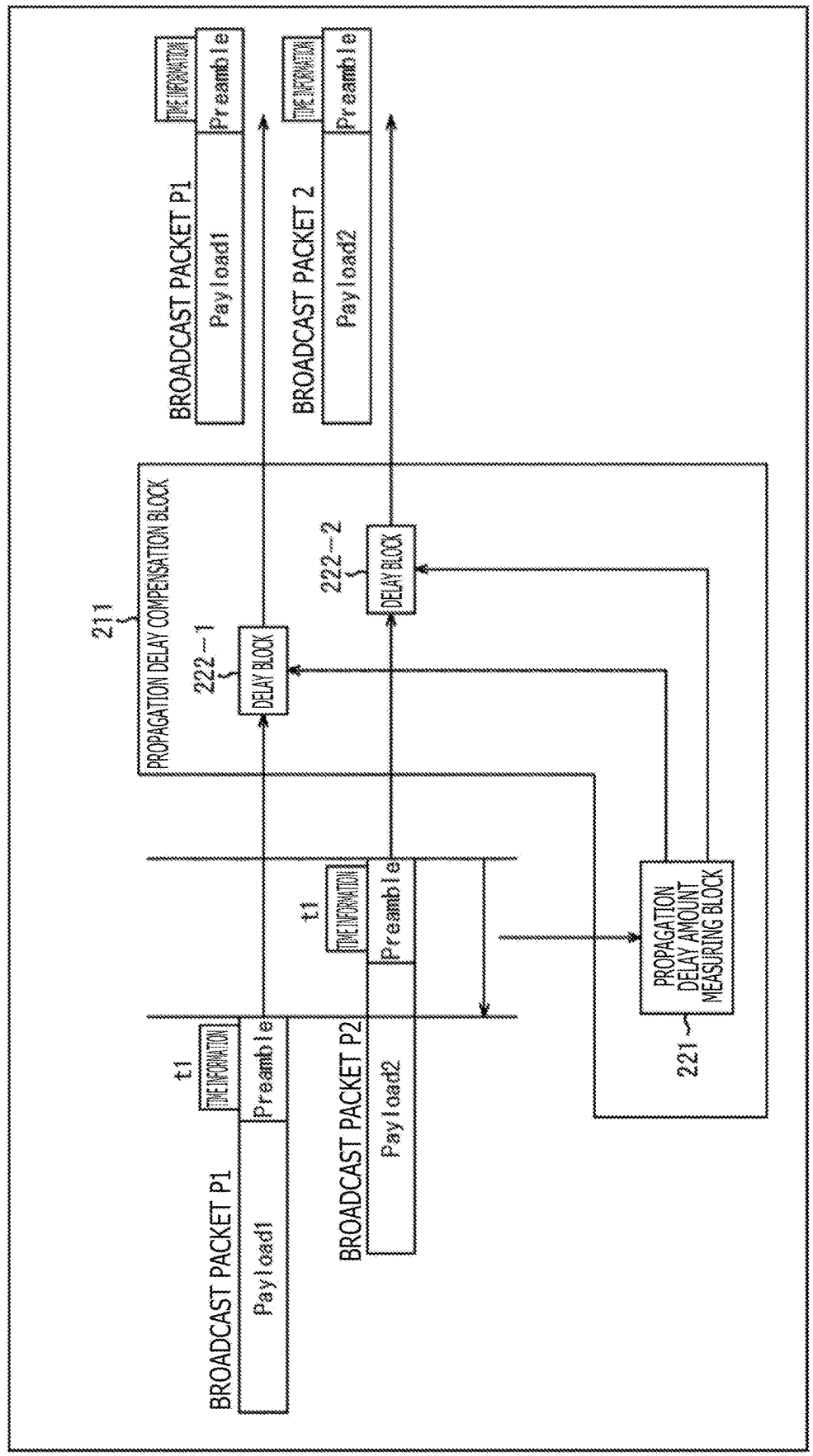
FIG. 10 is a diagram illustrating an example of a configuration of a propagation delay compensation block to which the present technology is applied.

FIG. 10 illustrates an example of a configuration of a propagation delay compensation block 211 for compensating the propagation delay amounts that are different for different transmission paths in the receiving apparatus 20. The propagation delay compensation block 211 has a propagation delay amount measuring block 221, a delay block 222-1, and a delay block 222-2 so as to eliminate the delay between the broadcast packets including the time information indicative of the same time, these broadcast packets being transmitted for two or more transmission paths.

In FIG. 10, since the propagation delay amount of the packet P2 transmitted by the broadcast wave from the sending station 40-2 is different from the propagation delay amount of the packet P1 transmitted by the broadcast wave from the sending station 40-1, these broadcast packets are entered (received) by the receiving apparatus 20 at different timings. Here, the propagation delay amount measuring block 221 monitors the broadcast packets transmitted by the broadcast waves sent from the sending station 40-1 and the sending station 40-2 so as to measure the difference ($\Delta t_{12}$) between the time at the beginning of the broadcast packet P1 and the time at the beginning of the broadcast packet P2.

In the propagation delay amount measuring block 221, measuring the difference ($\Delta t_{12}$) in the time between these broadcast packets can obtain the difference (T1−T2) between the propagation delay time T1 in the broadcast wave sent from the sending station 40-1 and the propagation delay time T2 in the broadcast wave sent from the sending station 40-2. That is, measuring the difference ($\Delta t_{12}$) in the input time (received time) between the broadcast packet P1 and the broadcast packet P2 measures the difference (T1−T2) in the propagation delay amount between these broadcast packets.

Then, in the propagation delay amount measuring block 221, the delay time according to this propagation delay amount difference (T1−T2) is supplied to the delay block 222-1 or the delay block 222-2.

In a propagation delay compensation block 211, the broadcast packet P1 transmitted by the broadcast wave from the sending station 40-1 is entered in the delay block 222-1 and the broadcast packet P2 transmitted by the broadcast wave from the sending station 40-2 is entered in the delay block 222-2. Further, since the delay time from the propagation delay amount measuring block 221 is supplied in the delay block 222-1 or the delay block 222-2, the broadcast packet P1 or the broadcast packet P2 to be entered is delayed according to this delay time.

Here, if the broadcast packet P2 transmitted by the broadcast wave from the sending station 40-2 is entered first and then the broadcast packet P1 transmitted by the broadcast wave from the sending station 40-1 is entered, for example, then measuring the difference ($\Delta t_{12}$) in the input time between the broadcast packet P1 and the broadcast packet P2 by the propagation delay amount measuring block 221 supplies the delay time according to the difference (T1−T2) in the propagation delay amount between these broadcast packets to the delay block 222-2.

In the propagation delay compensation block 211, the delay block 222-2 delays the broadcast packet P2 transmitted by the broadcast wave from the sending station 40-2 by following the delay time from the propagation delay amount measuring block 221. That is, in the delay block 222-2, the broadcast packet P2 is delayed until the broadcast packet P1 transmitted by the broadcast wave from the sending station 40-1 is entered in the propagation delay compensation block 211 (the delay block 222-1 thereof).

Then, in the propagation delay compensation block 211, when the broadcast packet P1 transmitted by the broadcast wave from the sending station 40-1 is entered, the broadcast packet P1 that has passed the delay block 222-1 and the broadcast packet P2 delayed by the delay block 222-2 are outputted at the same time. It should be noted that, at this moment, the broadcast packet P1 transmitted by the broadcast wave from the sending station 40-1 is outputted without being delayed (with 0 delay) by the delay block 222-1.

Consequently, the delay between the broadcast packet P1 and the broadcast packet P2 having the time information indicative of the same time t1 is eliminated (the delay becomes 0), these broadcast packets being transmitted along two or more transmission paths (the paths through the sending station 40-1 and the sending station 40-2); as a result, the propagation delay amounts that are different for two or more different transmission paths (the paths through the sending station 40-1 and the sending station 40-2) are compensated.

It should be noted that, in the receiving apparatus 20, the time T1 of the propagation delay in the broadcast wave sent from the sending station 40-1 and the time T2 of the propagation delay in the broadcast wave sent from the sending station 40-2 cannot be measured; however, if the times (T1 and T2) of these propagation delays for the transmission paths can be estimated, then the propagation delays can be compensated by use of the results of the estimation. However, this estimation of propagation delay times requires a circuit and complicated processing for estimating propagation delay times.

On the other hand, in the present technology, the compensation of propagation delays can be realized only by simply, indirectly, so to speak, measuring propagation delay amounts (delay amounts) between the broadcast packets including the time information indicative of the same time by use of the time information added to each broadcast packet and delaying a particular packet by following the results of this measurement. That is, the present technology allows the execution of delay compensation (propagation delay compensation) with a more simplified configuration without requiring a circuit and complicated processing for estimating propagation delay times. In addition, the present technology provides a merit of easier control operations because of the more simplified configuration.

(Places Where Propagation Delay Compensation Processing is Executed)

Figure 12:
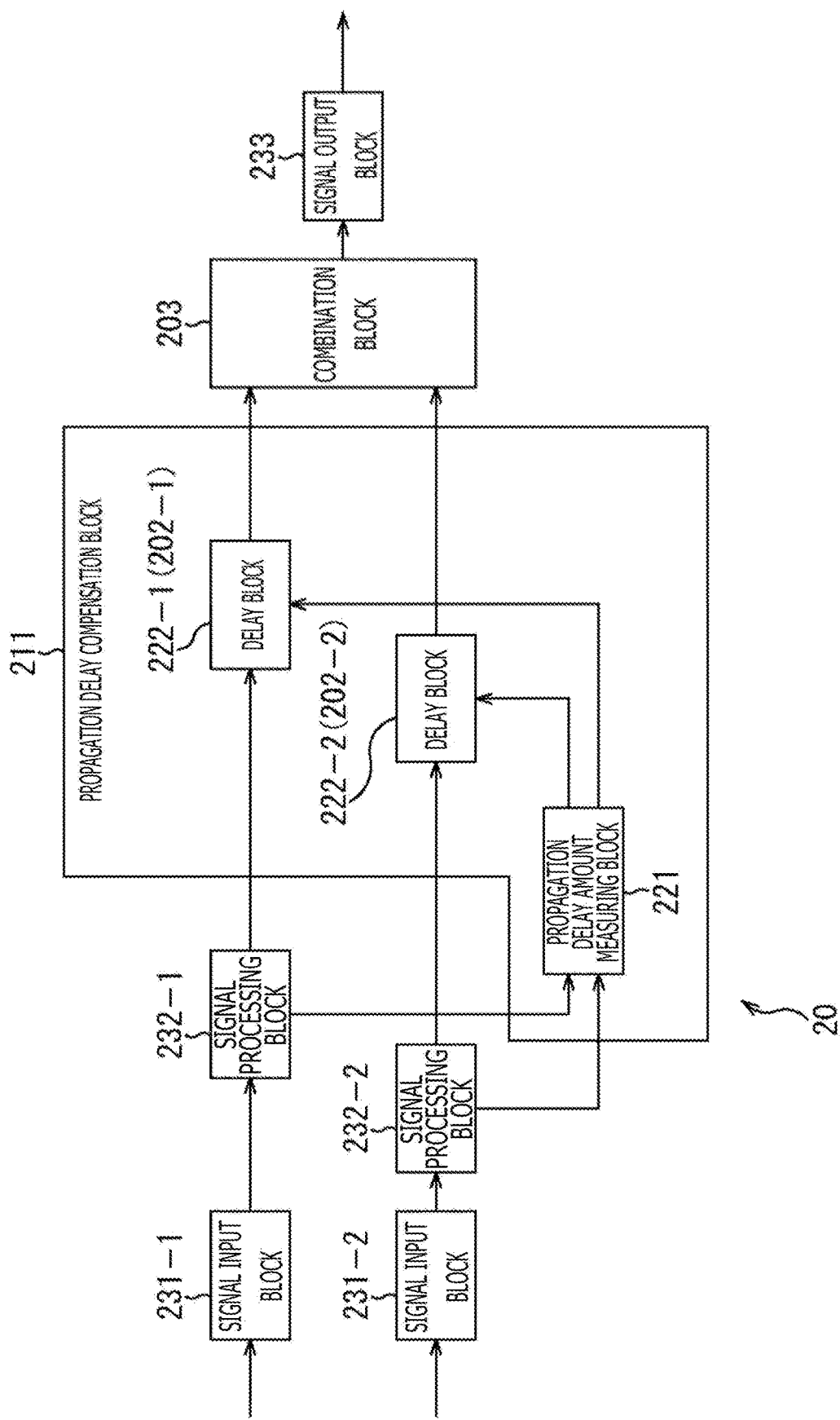
FIG. 12 is a diagram illustrating an example of a configuration in the case where a scheme 1 of the present technology is employed.
Figure 13:
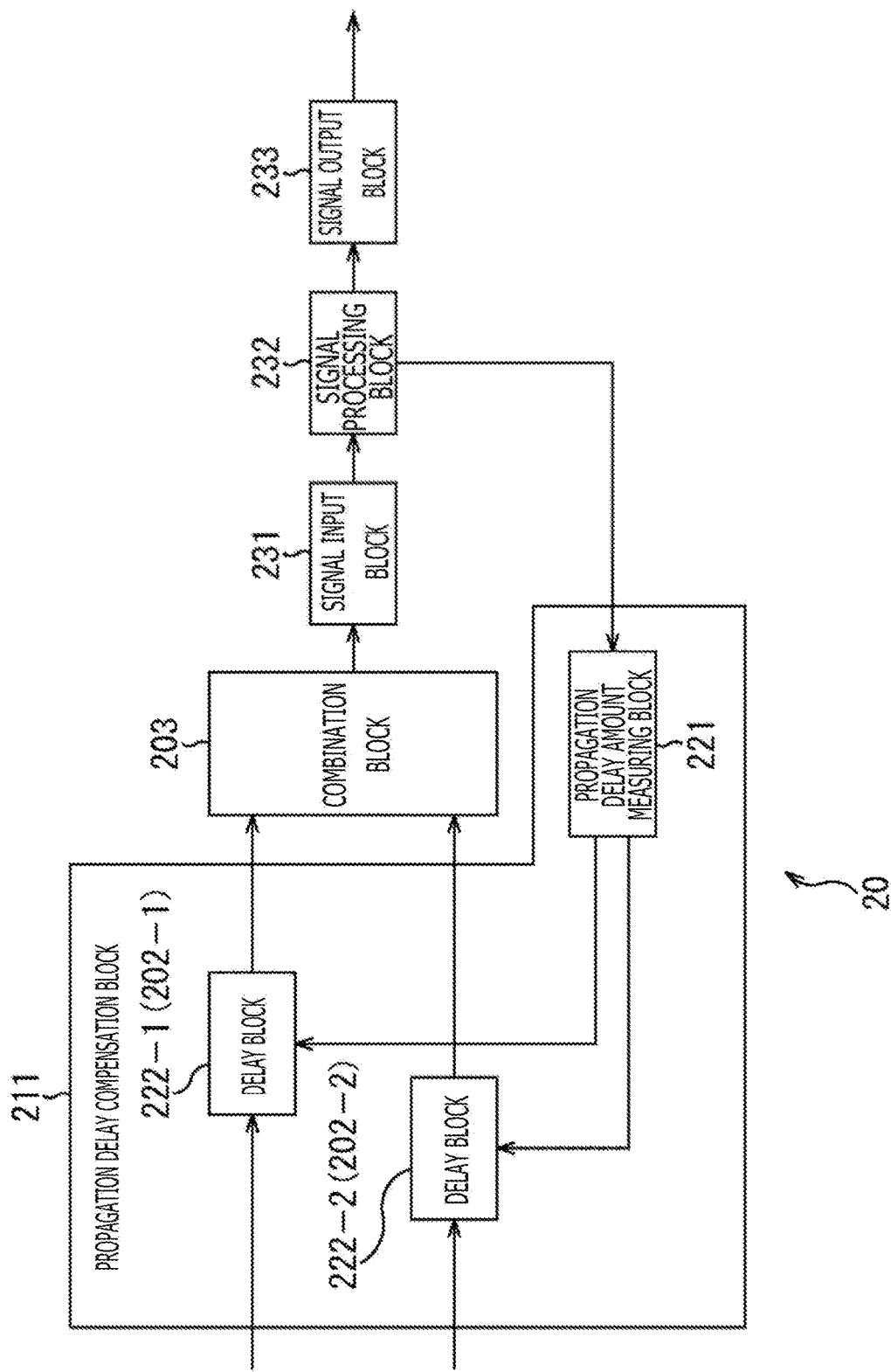
FIG. 13 is a diagram illustrating an example of a configuration in the case where a scheme 2 of the present technology is employed.

The following describes places where the propagation delay compensation processing is executed by the propagation delay compensation block 211 illustrated in FIG. 10 in the receiving apparatus 20 having the function of channel bonding with reference to FIG. 11 through FIG. 13. Here, for the purpose of comparison, configurations of related-art schemes are first described with reference to FIG. 11 and then configurations of schemes based on the present technology are described with reference to FIG. 12 and FIG. 13.

(Configurations of Related-Art Schemes)

A of FIG. 11 Illustrates a Configuration of the Related-Art Scheme 1.

In A of FIG. 11, a signal input block 231-1 processes an OFDM signal transmitted by the broadcast wave (the broadcast wave including the RF channel 1) from the sending station 40-1, the OFDM signal being entered in the signal input block 231-1 and outputs the processed signal to a signal processing block 232-1. The signal processing block 232-1 executes physical layer processing on the data from the signal input block 231-1 and outputs the processed data to the combination block 203. It should be noted that, in this physical layer processing, the processing related with the physical layer frame (physical layer packet), deinterleave processing, and error correction processing are executed.

Further, a signal input block 231-2 processes an OFDM signal transmitted by the broadcast wave (the broadcast wave including the RF channel 2) from the sending station 40-2, the OFDM signal being entered in the signal input block 231-2 and outputs the processed signal to a signal processing block 232-2. The signal processing block 232-2 executes physical layer processing on the data from the signal input block 231-2 and outputs the processed data to the combination block 203.

The combination block 203 rearranges the broadcast packets entered from the signal input block 231-1 and the broadcast packets entered from the signal input block 231-2 so as to output the entered broadcast packets to a signal output block 233. The signal output block 233 executes necessary processing on the broadcast packets (the broadcast packets after rearrangement) entered from the combination block 203 and outputs the data obtained by this processing to the subsequent circuit.

As described above, in the related-art scheme 1, the broadcast packets transmitted for two or more transmission paths are processed; however, since no propagation delay compensation processing is executed, the broadcast packets processed by the receiving apparatus 20 still have the propagation delay amounts that are different for the different transmission paths. Hence, in the receiving apparatus 20, even if the broadcast packets having different propagation delay amounts as described above are processed, the original stream cannot be correctly restored (recombined) from two or more divided streams.

B of FIG. 11 Illustrates a Configuration of a Related-Art Scheme 2.

As compared with the configuration illustrated in A of FIG. 11, a configuration illustrated in B of FIG. 11 has buffer memories before and after the signal processing block 232. That is, the data from the signal input block 231-1 is held in a buffer memory 241-1 and the data from the signal input block 231-2 is held in a buffer memory 241-2. The signal processing block 232 appropriately reads the data held in the buffer memory 241-1 or the buffer memory 241-2 so as to execute physical layer processing.

In the signal processing block 232, the broadcast packets obtained by the physical layer processing executed on the data from the buffer memory 241-1 are held in a buffer memory 242-1 and the broadcast packets obtained by the physical layer processing executed on the data from the buffer memory 241-2 are held in a buffer memory 242-2.

The combination block 203 appropriately reads the broadcast packets held in the buffer memory 242-1 or the buffer memory 242-2 and rearranges the broadcast packets processed by the signal processing block 232, outputting these broadcast packets to the signal output block 233. The signal output block 233 executes necessary processing on the broadcast packets (the rearranged broadcast packets) entered from the combination block 203 and outputs the data obtained as a result of this processing to the subsequent circuit.

As described above, in the related-art scheme 2, the buffer memories are arranged before and after the signal processing block 232 so as to process the data from two or more lines by one signal processing block 232 in a so-called time division manner, thereby restoring the original line. Thus, in the related-art scheme 2, as compared with the related-art scheme 1 described above, the physical layer processing by the signal processing block 232 is executed in a time division manner for each line, thereby reducing the number of circuits.

However, also in the related-art scheme 2, the propagation delay compensation processing is not executed, so that the broadcast packets processed by the receiving apparatus 20 still have propagation delay amounts that are different for different transmission paths. Hence, in the receiving apparatus 20, even if the broadcast packets having the different propagation delay amounts as described above are processed, the original stream cannot be correctly restored (recombined) from two or more divided streams.

(Configurational Example of Scheme 1 of Present Technology)

FIG. 12 illustrates an example of a configuration in the case where a scheme 1 of the present technology is employed.

In the configuration illustrated in FIG. 12, as compared with the above-mentioned configuration of A of FIG. 11, the propagation delay compensation block 211 is arranged between the signal processing block 232-1 and the signal processing block 232-2 and the combination block 203. This propagation delay compensation block 211 includes the propagation delay amount measuring block 221, the delay block 222-1, and the delay block 222-2. It should be noted that the delay block 222-1 and the delay block 222-2 are also equivalent to the buffer memory 202-1 and the buffer memory 202-2 mentioned above and illustrated in FIG. 4.

The signal input block 231-1 processes an OFDM signal transmitted by the broadcast wave (the broadcast wave including the RF channel 1 sent from the sending station 40-1, the OFDM signal being entered in the signal input block 231-1, and outputs the processed signal to the signal processing block 232-1. The signal processing block 232-1 executes physical layer processing on the data from the signal input block 231-1 and outputs the broadcast packets (the BB packets) obtained as a result of this processing to the delay block 222-1 of the propagation delay compensation block 211. It should be noted that, in this physical layer processing, the processing related with physical layer frame (physical layer packet), deinterleave processing, and error correction processing are executed.

The signal input block 231-2 processes an OFDM signal transmitted by the broadcast wave (the broadcast wave including the RF channel 2 sent from the sending station 40-2), the OFDM signal being entered in the signal input block 231-2, and outputs the processed signal to the signal processing block 232-2. The signal processing block 232-2 executes physical layer processing on the data from the signal input block 231-2 and outputs the broadcast packets (the BB packets) obtained as a result of this processing to the delay block 222-2 of the propagation delay compensation block 211.

Here, in the propagation delay compensation block 211, the propagation delay amount measuring block 221 monitors the broadcast packet P1 (FIG. 9, FIG. 10, etc.) processed by the signal processing block 232-1 and the broadcast packet P2 (FIG. 9, FIG. 10, etc.) processed by the signal processing block 232-2 so as to measure the difference ($\Delta t_{12}$) in input time (received time) between the broadcast packets having the time information indicative of the same time, thereby measuring the difference (T1−T2) in propagation delay amount between these broadcast packets. The propagation delay amount measuring block 221 supplies the delay time according to this indirectly measured difference (T1−T2) in propagation delay amount to the delay block 222-1 or the delay block 222-2.

For example, if the broadcast packet P1 is processed by the signal processing block 232-1 and the broadcast packet P2 is processed by the signal processing block 232-2 and the broadcast packet P2 including the time information indicative of time t1 is entered (received) before the broadcast packet P1 including the time information indicative of time t1 is entered (received), then a delay time according to the difference (T1−T2) in propagation delay amount between these broadcast packets is supplied to the delay block 222-2.

In the propagation delay compensation block 211, the delay block 222-1 and the delay block 222-2 are equivalent to the buffer memories, the delay block 222-2 delaying the broadcast packets (BB packets) entered from the signal processing block 232-2 by following the delay time from the propagation delay amount measuring block 221. On the other hand, in the delay block 222-1, the broadcast packets (BB packets) entered from the signal processing block 232-1 need not be delayed.

By following the BBP counter included in the extension header of each BB packet, for example, the combination block 203 appropriately reads the broadcast packets (the BB packets) held in the delay block 222-1 and the delay block 222-2 as buffer memories and rearranges the broadcast packets (the BB packets) on which the physical layer processing has been executed, thereby outputting the these broadcast packets to the signal output block 233.

In this case, the broadcast packets (the BB packets) read from the delay block 222-2 are delayed by the delay time according to the difference (T1−T2 (=$\Delta t_{12}$)) in the propagation delay amounts, while the broadcast packets (the BB packets) read from the delay block 222-1 are not delayed (the delay is 0). Consequently, the delay between the broadcast packets P1 and the broadcast packets P2 including the time information indicative of the same time t1, these packets being transmitted along two or more transmission paths (the transmission paths through the sending station 40-1 and the sending station 40-2), is eliminated (the delay is 0), as a result of which the propagation delay amounts that are different for two or more different transmission paths are compensated.

It should be noted that, here, the case has been described above in which the broadcast packet P2 is entered (received) before the broadcast packet P1; however, if the broadcast packet P1 is entered (received) before the broadcast packet P2, a delay time according to the difference (T1−T2) in propagation delay amount between these broadcast packets is supplied from the propagation delay amount measuring block 221 to the delay block 222-1. Then, in the propagation delay compensation block 211, the delay block 222-1 delays the broadcast packets (the BB packets) entered from the signal processing block 232-1 according to that delay time.

The signal output block 233 executes necessary processing on the broadcast packets (the rearranged broadcast packets) entered from the combination block 203 and outputs the data obtained as a result of this processing to the subsequent circuit. Here, for example, the rearranged BB packets are processed by the signal output block 233 and the IP packets obtained as a result of this processing are outputted to the subsequent circuit.

As described above, in the scheme 1 of the present technology, the broadcast packets transmitted for two or more transmission paths are processed, in which the propagation delay compensation processing is executed by the propagation delay compensation block 211 so as to eliminate the delay between the broadcast packets having the time information indicative of the same time, thereby compensating the propagation delay amounts that are different for different transmission paths. Therefore, in the receiving apparatus 20, processing the above-mentioned broadcast packets compensated with the propagation delay amounts allows the correct restoration (recombination) of the original stream from two or more divided streams.

Further, in the scheme 1 of the present technology, the propagation delay amounts between the broadcast packets including the time information indicative of the same time are indirectly measured, so to speak, by the propagation delay compensation block 211 by use the time information included in the broadcast packets and, by simply delaying particular broadcast packets by following a result of the measurement, the propagation delay can be compensated. That is, in the scheme 1 of the present technology, propagation delay compensation can be executed with a more simplified configuration without requiring the circuit and complicated processing for estimating a propagation delay time.

(Configurational Example of Scheme 2 of Present Technology)

FIG. 13 illustrates an example of a configuration in the case where a scheme 2 of the present technology is employed.

In the configuration illustrated in FIG. 13, as compared with the above-mentioned configuration of A of FIG. 11, the propagation delay compensation block 211 and the combination block 203 are arranged before the signal input block 231, the signal processing block 232, and the signal output block 233. This propagation delay compensation block 211 includes the propagation delay amount measuring block 221, the delay block 222-1, and the delay block 222-2. It should be noted that the delay block 222-1 and the delay block 222-2 are also equivalent to the buffer memory 202-1 and the buffer memory 202-2 mentioned above in FIG. 4.

In the propagation delay compensation block 211, the propagation delay amount measuring block 221 monitors the broadcast packet P1 (FIG. 9, FIG. 10, etc.) and the broadcast packet P2 (FIG. 9, FIG. 10, etc.) processed by the signal processing block 232 so as to measure the difference ($\Delta t_{12}$) in input time (received time) between the broadcast packets having the time information indicative of the same time, thereby measuring the difference (T1−T2) in propagation delay amount between these broadcast packets. The propagation delay amount measuring block 221 supplies the delay time according to measured difference (T1−T2) in propagation delay amount to the delay block 222-1 or the delay block 222-2.

For example, if the broadcast packet P1 and the broadcast packet P2 are processed by the signal processing block 232 and the broadcast packet P2 including the time information indicative of time t1 is entered (received) before the broadcast packet P1 including the time information indicative of time t1 is entered (received), then a delay time according to the difference (T1−T2) in propagation delay amount between these broadcast packets is supplied to the delay block 222-2.

In the propagation delay compensation block 211, the data (the broadcast packets) obtained by processing an OFDM signal transmitted by the broadcast wave sent from the sending station 40-2 is entered and held in the delay block 222-2. By following the delay time supplied from the propagation delay amount measuring block 221, the delay block 222-2 delays the data (the broadcast packets) entered in the delay block 222-2. On the other hand, in the delay block 222-1, the data (the broadcast packets) obtained by processing the OFDM signal transmitted by the broadcast wave sent from the sending station 40-1 need not be delayed.

The combination block 203 appropriately reads the data (the broadcast packets) held in the delay block 222-1 and the delay block 222-2 as buffer memories so as to rearrange the broadcast packets. The broadcast packets thus rearranged are outputted to the signal input block 231.

In this case, the broadcast packets read from the delay block 222-2 are delayed by the delay time according to the difference (T1−T2 (=$\Delta t_{12}$)) in the propagation delay amounts, while the broadcast packets read from the delay block 222-1 are not delayed (the delay is 0). Consequently, the delay between the broadcast packets P1 and the broadcast packets P2 including the time information indicative of the same time t1, these packets being transmitted along two or more transmission paths (the transmission paths through the sending station 40-1 and the sending station 40-2), is eliminated (the delay is 0), as a result of which the propagation delay amounts that are different for two or more different transmission paths are compensated.

It should be noted that, here too, the case in which the broadcast packet P2 is entered (received) before the broadcast packet P1; however, if the broadcast packet P1 is entered (received) before the broadcast packet P2, the difference is only that the packet to be delayed is the broadcast packet P1, so that the processing can be executed in the similar manner.

As described above, in the scheme 2 of the present technology, the propagation delay compensation processing is executed after the processing (the demodulation) of the OFDM signal, so that the circuits subsequent to the combination block 203 can be integrated into one line. In addition, in the scheme 2 of the present technology too, the propagation delay compensation processing is executed by the propagation delay compensation block 211 so as to eliminate the delay between the broadcast packets having the time information indicative of the same time, thereby compensating the propagation delay amounts that are different for different transmission paths. Therefore, in the receiving apparatus 20, processing the broadcast packets compensated with the propagation delay amounts described above can correctly restore (recombine) the original stream from the two or more divided streams.

Further, in the scheme 2 of the present technology, the propagation delay amounts between the broadcast packets including the time information indicative of the same time are indirectly measured, so to speak, by the propagation delay compensation block 211 by use the time information included in the broadcast packets and, by simply delaying particular broadcast packets by following a result of the measurement, the propagation delay can be compensated. That is, in the scheme 2 of the present technology, propagation delay compensation can be executed with a more simplified configuration without requiring the circuit and complicated processing for estimating a propagation delay time.

It should be noted that, in the above description, the time information is indicative of a time (an absolute time) at which a target physical layer frame (a physical layer packet) is sent from a sending facility (the sending apparatus 10); however, this time information may also be the to be indicative of the absolute time of a predetermined position in the stream of the physical layer frame (physical layer packets).

Here, the time at a predetermined position in a stream denotes a time of a predetermined timing during the processing of the bit at a predetermined position by the sending apparatus 10. Such a time of a predetermined timing during the processing of the bit at a predetermined position by the sending apparatus 10 includes a time of timing at which the bit at a predetermined position is outputted from a certain block of the sending apparatus 10 and a time of timing at which the bit at a predetermined position is processed in a certain block of the sending apparatus 10, for example.

Further, for the time information to be added to broadcast packets, the information of time specified by PTP (Precision Time Protocol), for example, may be used. In the above description, it is presumed that the target packets to be compensated for propagation delay have the time information indicative of the same time (time t1, for example); however, the time information need not always be indicative of the same time if the time information can identify a target broadcast packet to be compensated for propagation delay.

It should be noted that, in the above description, the sending apparatus 10 of a broadcasting station solely has configurations of a multiplexer and a modulation block for the convenience of description; however, with a general-purpose digital broadcasting system, a multiplexer and a modulation block are installed at different places. That is, in FIG. 8 for example, the sending apparatus 10 is indicated by dashed lines to the sending station 40-1 and the sending station 40-2, thereby indicating that a part (the modulation block, for example) of the functions of the sending apparatus 10 is installed at the sending station 40-1 and the sending station 40-2. In this case, the other function (the multiplexer, for example) of the sending apparatus 10 is installed inside the broadcasting station, for example.

Further, in the above description, the case was mainly described in which the two or more transmission paths include two or more broadcasting paths (the paths through the sending station 40-1 and the sending station 40-2) that are subject to channel bonding; however, the broadcasting paths need not be the paths subject to channel bonding. That is, in receiving the broadcast wave (the electromagnetic wave) from two or more broadcasting paths that are not subject to channel bonding, the receiving apparatus 20 can execute the propagation delay compensation processing, thereby compensating the propagation delay amounts that are different for two or more different broadcasting paths.

Still further, in the above description, the case in which the compensation of propagation delay amounts that are different for two or more different transmission paths (the paths of broadcasting) was described; however, the delays to be compensated for two or more transmission paths are not only propagation delays but also other types of delays. For example, it is assumed that delays such as signal delays be caused due to the parameter (the transmission parameter) of the physical layer for broadcast wave transmission or the installation of the sending apparatus 10 or the receiving apparatus 20; the delays such as signal delays can be compensated by executing the delay compensation processing (the propagation delay compensation processing) in the receiving apparatus 20.

Yet further, in the above description, two broadcasting paths corresponding to the RF channel 1 (RF1) and the RF channel 2 (RF2) were described as the two or more transmission paths, for example; however, the number of transmission paths may be not only two but also three or more. In addition, the transmission paths may be not only broadcasting paths but also other types of paths such as communication paths.

(2) Delay Compensation in Cooperation of Broadcasting and Communication

In the above description, broadcasting paths (the paths through the sending station 40-1 and the sending station 40-2) were described as the two or more transmission paths; however, the transmission paths may be not only broadcasting paths but also communication paths, for example. Therefore, the following describes the delay compensation of communication paths as well as broadcasting paths as the two or more transmission paths with reference to FIG. 14 through FIG. 16.

(Propagation Delay in Cooperation of Broadcasting and Communication)

Figure 14:
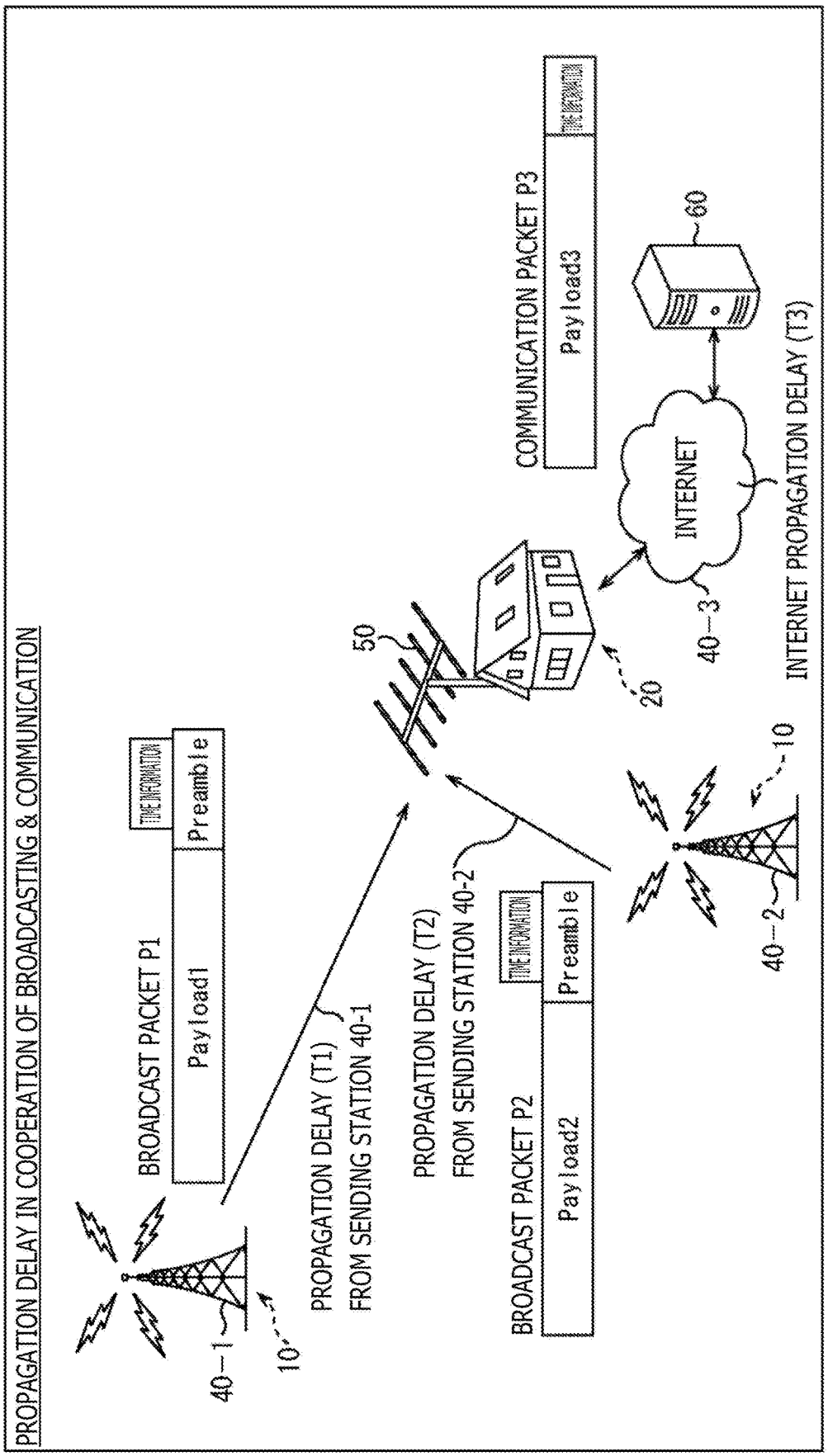
FIG. 14 is a diagram for describing an overview of the propagation delay in a cooperation of broadcasting and communication.

FIG. 14 is a diagram illustrating an overview of the propagation delay in the cooperation of broadcasting and communication.

As in FIG. 8, FIG. 14 illustrates that a broadcast wave (a broadcast wave including the RF channel 1) sent from the sending station 40-1 and a broadcast wave (a broadcast wave including the RF channel 2) sent from the sending station 40-2 are received by the antenna 50 installed on a house and the received broadcast wave is processed by the receiving apparatus 20 (a television receiver having communication functions, for example) installed in the house. In addition, this receiving apparatus 20 can be connected to a server 60 through the Internet 40-3 so as to send and receive data through the Internet 40-3. It should be noted that, in the following description, the packets that are transmitted via the Internet 40-3 are also referred to as communication packets P3.

Here, that the broadcast waves sent from the sending stations such as the sending station 40-1 and the sending station 40-2 have different propagation delay amounts is as described above. Further, in the communication between the receiving apparatus 20 and the server 60 via the Internet 40-3, a delay (a propagation delay) is also caused. Therefore, since the packets (the broadcast packets and the communication packets) received by the receiving apparatus 20 come to have different propagation delay amounts for two or more paths including broadcasting paths and the communication paths, these propagation delays must be compensated.

Therefore, in the present technology, if a communication path is included in addition to a broadcasting path as the two or more transmission paths, time information is added also to the communication packets to be transmitted along a communication path so as to measure the difference value in the propagation delay amount between the transmission paths by use of this time information, thereby compensating the propagation delays.

For example, in FIG. 14, the time information is included in the preamble of the broadcast packet P1 transmitted by the broadcast wave from the sending station 40-1 and the preamble of the broadcast packet P2 transmitted by the broadcast wave from the sending station 40-2. Likewise, the time information is also included in the communication packet P3 transmitted from the server 60 via the Internet 40-3.

Figure 15:
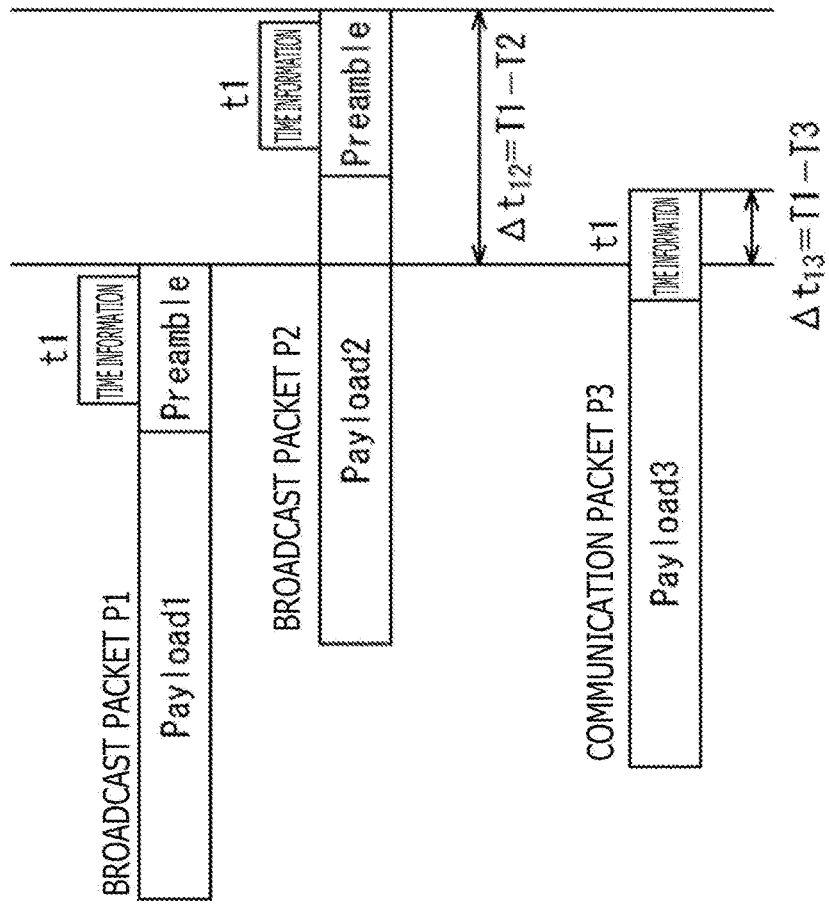
FIG. 15 is a diagram for describing an influence of the propagation delay in a cooperation of broadcasting and communication.

Here, as illustrated in FIG. 15, since the broadcast packet P1 transmitted by the broadcast wave from the sending station 40-1, the broadcast packet P2 transmitted by the broadcast wave from the sending station 40-2, and the communication packet P3 transmitted from the server 60 via the Internet 40-3 have different propagation delay amounts, the timings at which these packets are entered (received) in the receiving apparatus 20 are different.

In FIG. 15, the packets having the time information indicative of the same time t1, these packets being transmitted for two or more transmission paths (the paths through the sending station 40-1 and the sending station 40-2 and via the Internet 40-3), are entered (received) in the order of the broadcast packet P2, the communication packet P3, and the broadcast packet P1, so that, with reference to the most delayed broadcast packet P1, the other packets (the broadcast packet P2 and the communication packet P3) are delayed.

That is, if the difference ($\Delta t_{12}$) between the time at the beginning of the broadcast packet P1 and the time at the beginning of the broadcast packet P2 is made 0, then the difference (T1−T2) between the time T1 of propagation delay and the time T2 of propagation delay is also made 0. In addition, if the difference ($\Delta t_{13}$) between the time at the beginning of the broadcast packet P1 and the time at the beginning of the communication packet P3 is made 0, then the difference (T1–T3) between the time T1 of propagation delay and the time T3 of propagation delay is also made 0. Thus, with reference to the broadcast packet P1, making 0 the difference in time between the other packets (the broadcast packet P2 and the communication packet P3) allows the compensation of the propagation delay amounts that are different for the different transmission paths.

To be more specific, the packets entered (received) first (the broadcast packet P2 and the communication packet P3 in FIG. 15, for example) are delayed until the packet to be entered (received) next (the broadcast packet P1 in FIG. 15, for example) so as to eliminate the delay between these packets (the delay between the broadcast packet P1, the broadcast packet P2, and the communication packet P3 in FIG. 15, for example) (making the delay 0). Consequently, in the receiving apparatus 20, the propagation delay amounts that are different for the two or more different transmission paths including the broadcasting paths and the communication path are compensated.

(Configurational Example of Case in Which Communication Path is Included in Two or More Transmission Paths)

Figure 16:
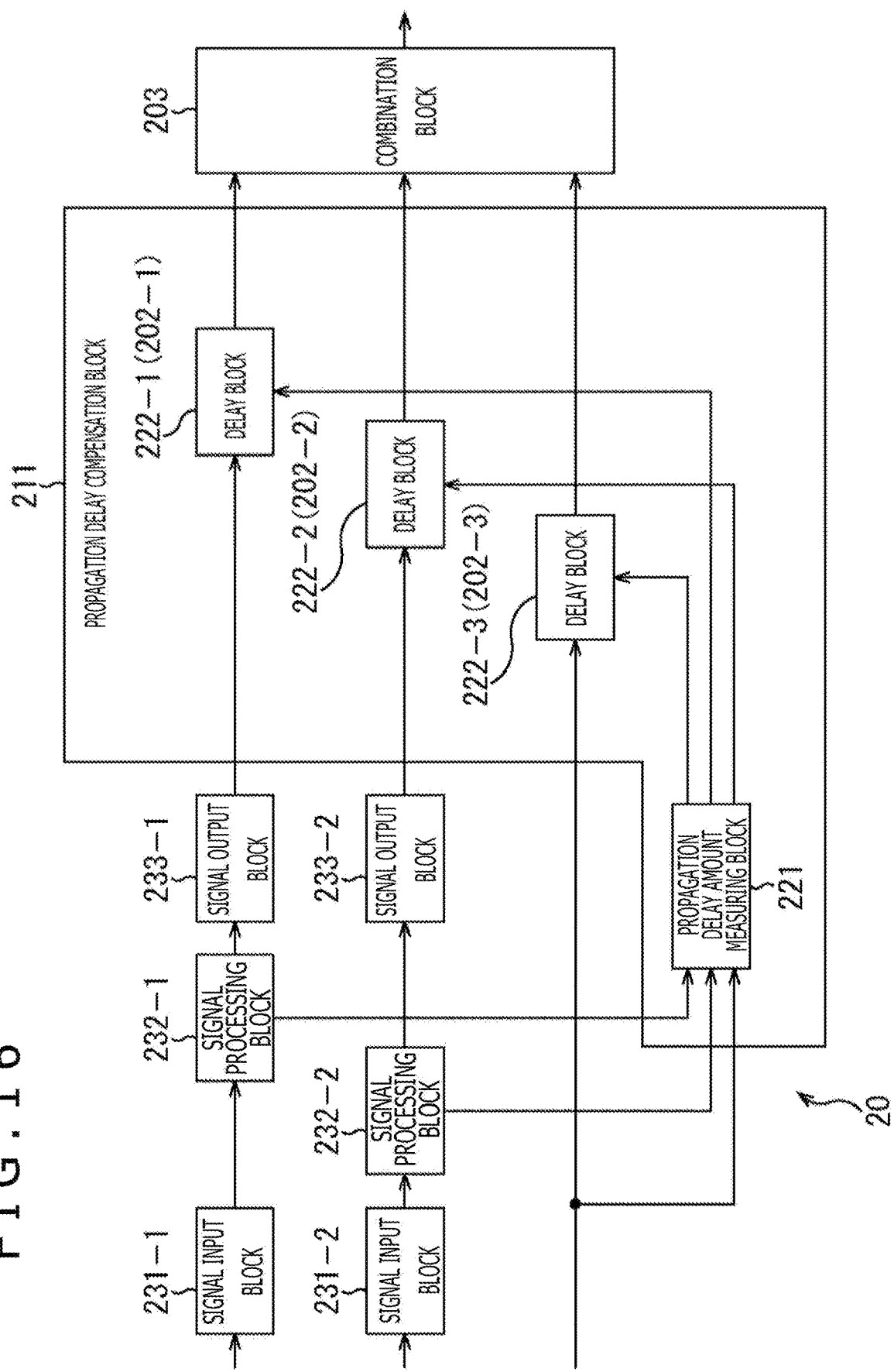
FIG. 16 is a diagram illustrating an example of a configuration in the case where a communication path is included in two or more transmission paths.

FIG. 16 is a diagram illustrating an example of a configuration in which a communication path is included in two or more transmission paths.

As compared with the configuration illustrated in FIG. 12, a signal from the line of the communication path (the Internet 40-3) is entered in addition to the lines of the broadcast wave (the broadcast wave including the RF channel 1) sent from the sending station 40-1 and the broadcast wave (the broadcast wave including the RF channel 2) sent from the sending station 40-2 in the configuration illustrated in FIG. 16.

The signal input block 231-1 processes an OFDM signal transmitted by the broadcast wave sent from the sending station 40-1, the OFDM signal being entered in the signal input block 231-1, and outputs the processed OFDM signal to the signal processing block 232-1. The signal processing block 232-1 executes the physical layer processing on the data from the signal input block 231-1 and outputs the broadcast packets (the BB packets) obtained as a result of the processing to the signal output block 233-1. The signal output block 233-1 executes necessary processing on the broadcast packets (the BB packets) entered from the signal processing block 232-1 and outputs the IP packets obtained as a result of the processing to the delay block 222-1 of the propagation delay compensation block 211.

The signal input block 231-2 processes an OFDM signal transmitted by the broadcast wave sent from the sending station 40-2, the OFDM signal being entered in the signal input block 231-2, and outputs the processed OFDM signal to the signal processing block 232-1. The signal processing block 232-2 executes the physical layer processing on the data from the signal input block 231-2 and outputs the broadcast packets (the BB packets) obtained as a result of the processing to the signal output block 233-2. The signal output block 233-2 executes necessary processing on the broadcast packets (the BB packets) entered from the signal processing block 232-2 and outputs the IP packets obtained as a result of the processing to the delay block 222-2 of the propagation delay compensation block 211.

Further, in the receiving apparatus 20, the communication packets (the IP packets) transmitted from the server 60 via the Internet 40-3 are received and entered in the delay block 222-3 of the propagation delay compensation block 211.

Here, in the propagation delay compensation block 211, the propagation delay amount measuring block 221 monitors the broadcast packet P1 (FIG. 15, etc.) processed by the signal processing block 232-1, the broadcast packet P2 (FIG. 15, etc.) processed by the signal processing block 232-2, and the communication packet P3 (FIG. 15, etc.) received via the Internet 40-3. Then, the propagation delay amount measuring block 221 measures the differences ($\Delta t_{12}$, $\Delta t_{13}$) in the input time (the received time) between the broadcast packets and the communication packets having the time information indicative of the same time, thereby measuring the differences (T1–T2, T1–T3) in the propagation delay amount between these packets.

The propagation delay amount measuring block 221 supplies the delay time according to the indirectly measured differences (T1–T2, T1–T3) between propagation delay amounts to the delay block 222-1, the delay block 222-2, or the delay block 222-3.

For example, if the broadcast packet P1 is processed by the signal processing block 232-1, the broadcast packet P2 is processed by the signal processing block 232-2, and the communication packet P3 is entered (received) and, when the packets having the time information indicative of the same time $t_1$ are received in the order of the broadcast packet P2, the communication packet P3, and the broadcast packet P1, then the delay time according to the differences (T1–T2, T1–T3) in the propagation delay amount between these packets is supplied to the delay block 222-2 and the delay block 222-3.

In the propagation delay compensation block 211, the delay block 222-1 through the delay block 222-3 are equivalent to the buffer memories, the delay block 222-2 delaying the broadcast packet (IP packet) entered from the signal output block 233-2 by following the delay time (T1–T2 (=$\Delta t_{12}$)) from the propagation delay amount measuring block 221. In addition, the delay block 222-3 delays the communication packet (the IP packet) received via the Internet 40-3 by following the delay time (T1–T3 (=$\Delta t_{13}$)) from the propagation delay amount measuring block 221. On the other hand, in the delay block 222-1, the delay for the broadcast packet (the IP packet) entered from the signal output block 233-1 is not necessary.

The combination block 203 appropriately reads the broadcast packets (the IP packets) and the communication packets (the IP packets) held in the delay block 222-1 through the delay block 222-3 as buffer memories so as to rearrange the broadcast packets and the communication packets as IP packets. The broadcast packets (the IP packets) and the communication packets (the IP packets) thus rearranged are outputted to the subsequent circuit.

In this case, the broadcast packets (the IP packets) read from the delay block 222-2 are delayed by a delay time according to the difference (T1–T2 (=$\Delta t_{12}$)) between the propagation delay amounts and the communication packets (the IP packets) read from the delay block 222-3 are delayed by a delay time according to the difference (T1–T3 (=$\Delta t_{13}$)) between the propagation delay amounts. On the other hand, the broadcast packets (the IP packets) read from the delay block 222-1 are not delayed (the delay is 0).

Consequently, there occurs no delay (the delay becomes 0) between the broadcast packet P1, the broadcast packet P2, and the communication packet P3 having the time information indicative of the same time, these packets being transmitted for two or more different transmission paths (the paths through the sending station 40-1, the sending station 40-2, and the Internet 40-3). As a result, the propagation delay amounts that are different for two or more different transmission paths are compensated.

It should be noted that, with reference to the most delayed broadcast packet P1 of the packets having the time information indicative of the same time, these packets being transmitted for two or more different transmission paths, the other packets (the broadcast packet P2 and the communication packet P3) are delayed; however, if the broadcast packet P2 and/or the communication packet P3 is most delayed, the other packets may be delayed with reference to the broadcast packet P2 and/or the communication packet P3.

As described above, even if the communication path is included in addition to the broadcast path in the two or more transmission paths, the propagation delay compensation processing is executed by the propagation delay compensation block 211 so as to eliminate (prevent the fluctuation between delays) the delay between the broadcast packets and the communication packets having the time information (the time stamp) indicative of the same time, thereby compensating the propagation delay amounts that are different for the different transmission paths. Hence, in the receiving apparatus 20, the original stream can be correctly restored (recombined) from two or more divided streams by processing the broadcast packets and the communication packets compensated with propagation delay amounts described above.

It should be noted that, for the time information to be added to the communication packet, the information of the time specified by NTP (Network Time Protocol), for example, may be used. In addition, in the case of a communication path such as the Internet 40-3, a delay other than propagation delays may be assumed, but, in the above description, propagation delays were mentioned as one example. However, a delay other than propagation delays may be considered.

(3) Delay Compensation in Case Where Time is Shifted for Each Sending Facility

Meanwhile, in the above description, the compensation of the propagation delay amounts that are different for two or more different transmission paths was explained; however, there may be a shift in the sending timing between broadcast packets for different sending facilities such as the sending station 40-1 and the sending station 40-2. Even in this case, such a shift in time between the sending facilities can be compensated along with the propagation delays as a result of delaying the packets with reference to the most delayed broadcast packet for the broadcast packets having the time information indicative of the same time.

Figure 17:
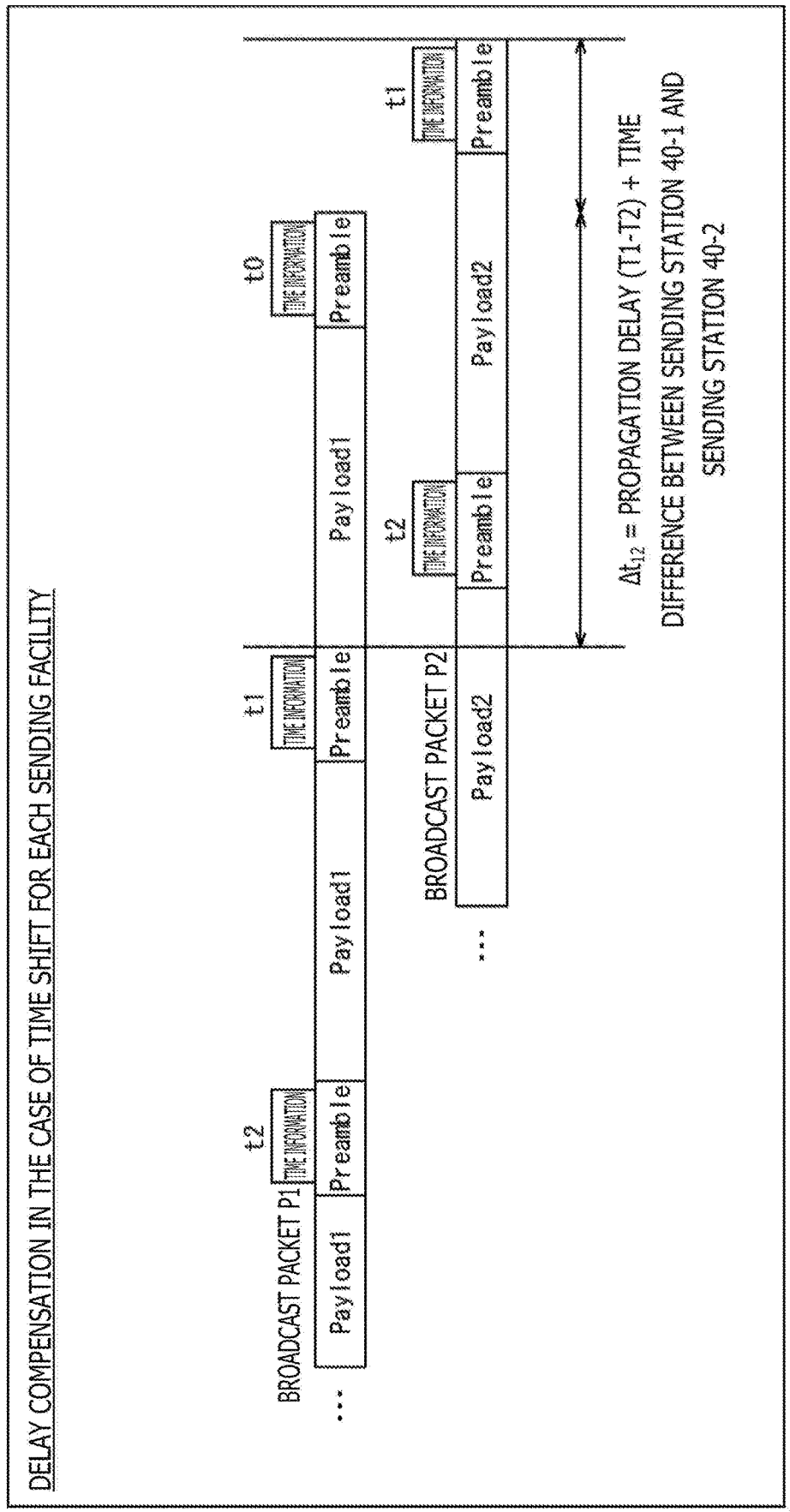
FIG. 17 is a diagram for describing the delay compensation in the case where time is shifted for each sending facility.

FIG. 17 is a diagram illustrating the delay compensation in the case where there is a time shift between the sending facilities.

In FIG. 17, since there is a difference in the propagation delay amount between the broadcast packet P1 transmitted by the broadcast wave (the broadcast wave including the RF channel 1) from the sending station 40-1 and the broadcast packet P2 transmitted by the broadcast wave (the broadcast wave including the RF channel 2) from the sending station 40-2 and there is a shift in sending timing between the sending facilities, these broadcast packets are entered (received) at different timings in the receiving apparatus 20.

In FIG. 17, the broadcast packets having the time information indicative of the same time $t_1$, these broadcast packets being transmitted for two or more different transmission paths (the paths through the sending station 40-1 and the sending station 40-2) are received in the order of the broadcast packet P2 and the broadcast packet P1, so that, with reference to the most delayed broadcast packet P1, the other packet (the broadcast packet P2) is delayed.

That is, if the difference ($\Delta t_{12}$) between the time of the beginning of the broadcast packet P1 including the time information indicative of time t1 and the time of the beginning of the broadcast packet P2 including the time information indicative of time t1 is made 0, then a value obtained by adding the difference (T1−T2) between time T1 of propagation delay and time T2 of propagation delay to the shift (the difference in time between the sending station 40-1 and the sending station 40-2) between the sending facilities becomes 0. Consequently, the propagation delay amounts that are different for two or more different transmission paths and the shift in sending time between the broadcast packets of the different sending facilities can be compensated.

To be more specific, the broadcast packet (the broadcast packet P2 including the time information indicative of time t1 in FIG. 17, for example) entered (received) first can be delayed until the broadcast packet to be entered (received) next (the broadcast packet P1 including the time information indicative of time t1 in FIG. 17, for example) is entered (received), thereby eliminating (making the delay 0) the delay between these broadcast packets (the delay between the broadcast packet P1 and the broadcast packet P2 including the time information indicative of time t1 in FIG. 17, for example). Consequently, in the receiving apparatus 20, not only the propagation delay amounts that are different for the two or more different transmission paths including the broadcasting paths but also the shift in sending time between the broadcast packets for the different sending facilities can be compensated.

As described above, even if there is a shift in sending timing between the broadcast packets for the sending facilities such as the sending station 40-1 and the sending station 40-2, the delay compensation processing (the propagation delay compensation processing) is executed by the propagation delay compensation block 211 so as to eliminate the delay between the broadcast packets having the time information indicative of the same time, thereby compensating the propagation delay amounts that are different for different transmission paths and the shift in sending time between the broadcast packets for the different sending facilities. Hence, in the receiving apparatus 20, the original stream can be correctly restored (recombined) from two or more divided streams by processing these broadcast stream compensated with the propagation delay amounts and the shift in the sending time.

It should be noted that, in FIG. 17, the case where there is a shift in the sending time between the broadcast packets for the different sending facilities such as the sending station 40-1 and the sending station 40-2 is explained; however, the similar processing can also be executed in the case where there is a shift in the sending timing between communication packets by the server 60 connected to the Internet 40-3.

4. Flow of Delay Compensation Processing on Receiving Side

Figure 18:
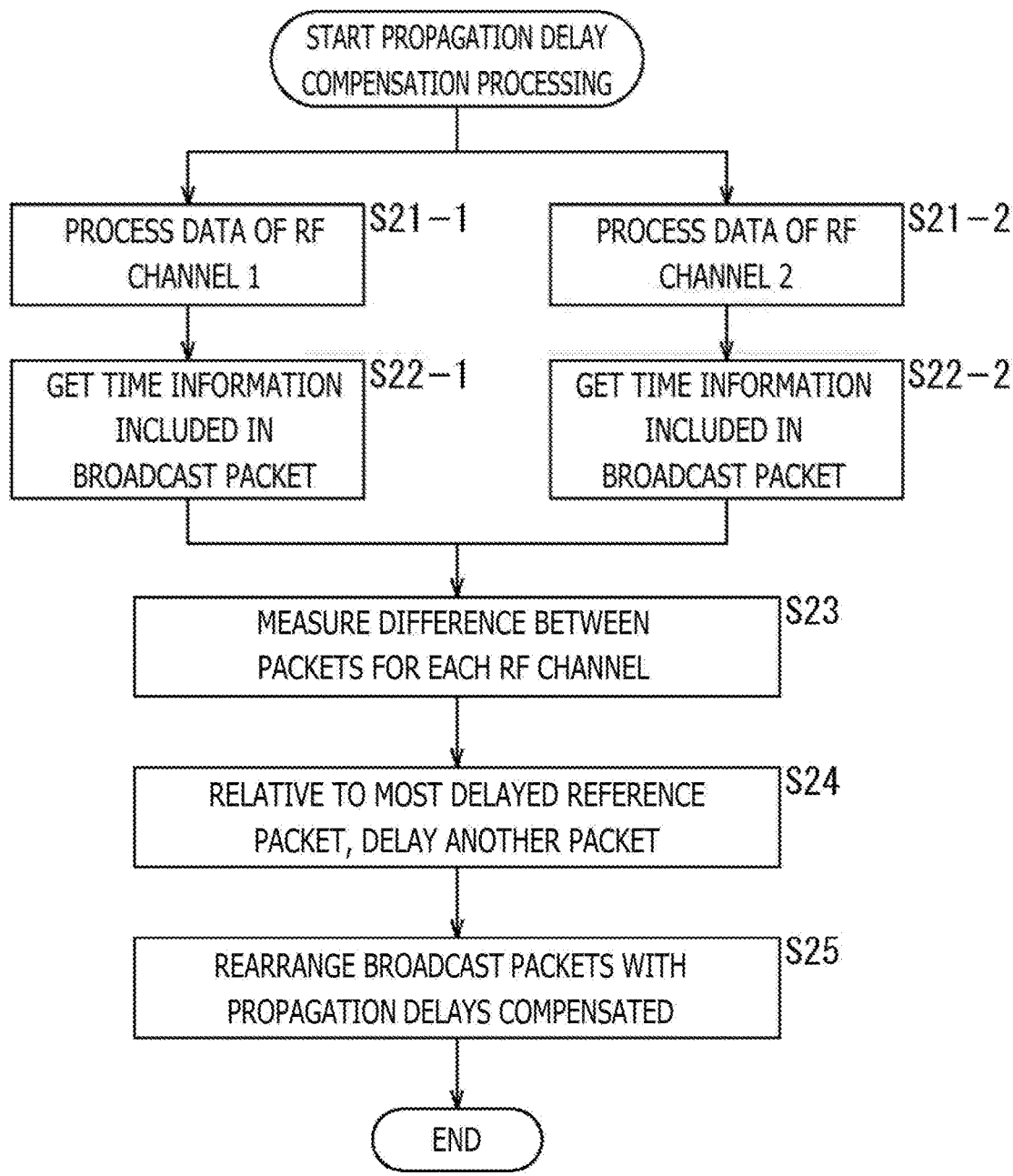
FIG. 18 is a flowchart indicative of a flow of delay compensation processing.

The following describes a flow of the propagation delay compensation processing that is executed by the receiving apparatus 20 with reference to a flowchart in FIG. 18. It should be noted that the description of this propagation delay compensation processing assumes that the receiving apparatus 20 has the configuration described with reference to FIG. 12 as one example.

In step S21-1, the signal processing block 232-1 executes the processing (the physical layer processing) on an OFDM signal transmitted by the broadcast wave (the broadcast wave including the RF channel 1) sent from the sending station 40-1, thereby processing the data of the RF channel 1 (RF1).

In step S22-1, the signal processing block 232-1 acquires the time information (FIG. 9, etc.) included in the broadcast packet P1 (the preamble thereof) obtained as a result of the processing executed in step S21-1. It should be noted that the broadcast packet P1 processed by the signal processing block 232-1 is outputted to the delay block 222-1 of the propagation delay compensation block 211.

In step S21-2, the signal processing block 232-2 executes the processing (the physical layer processing) on an OFDM signal transmitted by the broadcast wave (the broadcast wave including the RF channel 2) sent from the sending station 40-2, thereby processing the data of the RF channel 2 (RF2).

In step S22-2, the signal processing block 232-2 acquires the time information (FIG. 9, etc.) included in the broadcast packet P2 (the preamble thereof) obtained as a result of the processing executed in step S21-2. It should be noted that the broadcast packet P2 processed by the signal processing block 232-2 is outputted to the delay block 222-2 of the propagation delay compensation block 211.

It should be noted that, in the receiving apparatus 20, the processing (the data processing of the RF channel 1) of step S21-1 through step S22-1 and the processing (the data processing of the RF channel 2) of step S21-2 through S22-2 are executed in parallel.

In step S23, the propagation delay amount measuring block 221 monitors the broadcast packet P1 processed in steps S21-1 through S22-1 and the broadcast packet P2 processed in steps S21-2 through S22-2 so as to measure the difference (T1−T2 (=$\Delta t_{12}$), for example) in the propagation delay amount between the broadcast packets including the time information indicative of the same time (time t1, for example), these packets being transmitted for two or more different transmission paths. The propagation delay amount measuring block 221 supplies the delay time according to the measured propagation delay amount difference (T1−T2 (=$\Delta t_{12}$), for example) to the delay block 222-1 or the delay block 222-2.

It should be noted that this propagation delay amount difference is measured by obtaining the difference in the input time (received time) between the broadcast packets having the time information indicative of the same time. Further, the difference in the input time (received time) between the broadcast packets can be measured by comparing the input times (received times) for the different packets by use of the internal time of the receiving apparatus 20, for example.

In step S24, the delay block 222-1 or the delay block 222-2 delays the broadcast packet (the broadcast packet P1 or the broadcast packet P2) entered from the signal processing block 232-1 or the signal processing block 232-2 by following the delay time (the delay time according to the difference between the propagation delay amounts) supplied from the propagation delay amount measuring block 221. Consequently, with reference to the most delayed packet (the broadcast packet P1, for example) of the broadcast packets having the time information indicative of the same time (time t1, for example), these broadcast packets being transmitted along two or more different transmission paths, the other packet (the broadcast packet P2, for example) is delayed.

In step S25, the combination block 203 appropriately reads the broadcast packet (the broadcast packet P1 or the broadcast packet P2) held in the delay block 222-1 or the delay block 222-2 as the buffer memories so as to rearrange the broadcast packets with the propagation delay compensated by the processing in step S24.

The processing operations of steps S24 and S25 are executed by the combination block 203 as follows, for example. That is, the combination block 203 appropriately reads the broadcast packets (the BB packets) held in the delay block 222-1 or the delay block 222-2 as the buffer memories by following the BBP counter included in the extension header of the broadcast packets (the BB packets) so as to rearrange the broadcast packets (the BB packets) with the physical layer processing executed (S25). In this processing, the delay between the broadcast packets (the BB packets) is eliminated (the delay becomes 0) by the processing in step S24 and the different propagation delays for two or more different transmission paths are compensated.

It should be noted that the broadcast packets (the BB packets) rearranged by the processing in step S25 are processed by the signal output block 233 to be outputted as IP packets, for example. When the processing in step S25 is completed, the propagation delay compensation processing illustrated in FIG. 18 comes to an end.

The propagation delay compensation processing is executed along the flow as described above. In this propagation delay compensation processing, the propagation delay amounts that are different for different transmission paths are compensated by indirectly measuring the difference in the propagation delay amount between the transmission paths by use of the time information added to the broadcast packets transmitted for two or more different transmission paths and delaying a particular broadcast packet according to this difference between the propagation delay amounts.

It should be noted that, in the propagation delay compensation processing illustrated in FIG. 18, the delay compensation in the case where the broadcast path is included in two or more transmission paths was described; however, as described above, the delay compensation can be realized also in the case where communication paths are included in two or more transmission paths or in the case where there is a shift in the sending time between the packets for two or more different sending facilities. It should also be noted that, in the case of communication paths, the propagation delay changes with time in accordance with a network situation such as the Internet 40-3, so that the propagation delay can be compensated by executing the propagation delay compensation processing illustrated in FIG. 18 from time to time.

5. Modifications

In the above description, ATSC (especially, ATSC3.0) employed in the United States of America and other countries was described as a digital broadcasting standard; however, the present technology may be applied to ISDB (Integrated Services Digital Broadcasting) employed by Japan and other countries and DVB (Digital Video Broadcasting) employed by European countries. In addition, in the above description, ATSC3.0 in which IP transmission scheme is employed was described by way of example; however, the present technology may be applied to other schemes such as MPEG2-TS (Transport Stream) and the like, for example, in addition to the IP transmission scheme.

Further, the present technology can be applied, as digital broadcasting, to the satellite broadcasting using a BS (Broadcasting Satellite) or a CS (Communication Satellite) or a wired broadcasting such as a cable television (CATV) in addition to terrestrial broadcasting.

The names such as packets described above are illustrative only; therefore, other names may be used. However, the difference between these names is the different in form and therefore there is no difference between the substantial contents of the target packets. For example, a BB packet (BBP: Baseband Packet) may be referred to as a BB stream (Baseband Stream) or a BB frame (BBF: Baseband Frame).

Further, in the above description, while the information of time specified by PTP (Precision Time Protocol) and NTP (Network Time Protocol) was mainly described as the time information added to each packet, it is not limited to the information. For example, the information of time specified by UTC (Coordinated Universal Time) and 3GPP (Third Generation Partnership Project), the information of time included in GPS (Global Positioning System), and any other information of time such as the information of time having uniquely determined formats may be used as the time information added to each packet.

It should be noted that the present technology can also be applied to predetermined standards (standards other than digital broadcasting standards) specified by assuming the use, as the transmission paths, of such communication lines (communication networks) as the Internet and telephone lines, for example, that are transmission paths other than broadcasting networks. Further, the receiving apparatus 20 illustrated in FIG. 1 may be a mobile receiving machine such as a mobile telephone, a smartphone, or a tablet terminal or an onboard machine installed in a vehicle, in addition to a stationary receiving machine such as a television receiver, an STB (Set Top Box) or a video recorder.

6. Computer Configuration

Figure 19:
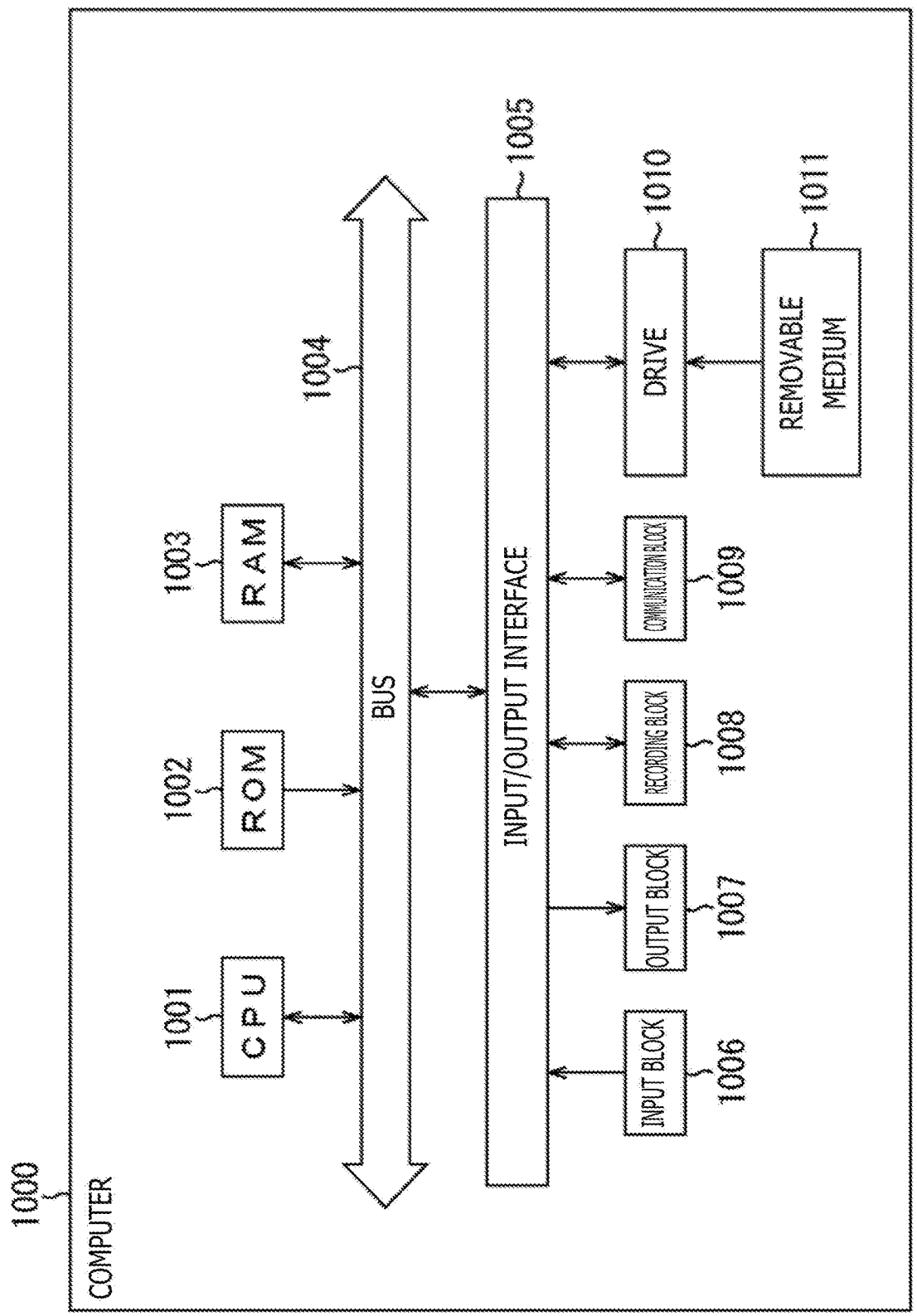
FIG. 19 is a diagram illustrating an example of a configuration of a computer.

The above-mentioned sequence of processing operations can be executed by hardware as well as software. For the execution of the sequence of processing operations by software, the programs included in that software are installed in a computer. FIG. 19 is a diagram illustrating an example of a configuration of the hardware of a computer that executes the above-mentioned sequence of processing operations by programs.

In a computer 1000, a CPU (Central Processing Unit) 1001, a ROM (Read Only Memory) 1002, and a RAM (Random Access Memory) 1003 are interconnected by a bus 1004. The bus 1004 is further connected to an input/output interface 1005. The input/output interface 1005 is connected to an input block 1006, an output block 1007, a recording block 1008, a communication block 1009, and a drive 1010.

The input block 1006 includes a keyboard, a mouse, a microphone, and the like. The output block 1007 includes a display, a speaker, and the like. The recording block 1008 includes a hard disk drive, a nonvolatile memory, and the like. The communication block 1009 includes a network interface and the like. The drive 1010 drives a removable medium 1011 such as a magnetic disc, an optical disc, a magneto-optical disc, a semiconductor memory, or the like.

In the computer 1000 configured as described above, the CPU 1001 loads programs from the ROM 1002 or the recording block 1008 into the RAM 1003 via the input/output interface 1005 and the bus 1004 and executes the loaded programs so as to execute the above-mentioned sequence of processing operations.

The programs to be executed by the computer 1000 (the CPU 1001) can be provided as recorded to the removable medium 1011 as a package medium and the like, for example. In addition, the programs can be provided via a wired or wireless transmission medium such as a local area network, the Internet, and digital satellite broadcasting.

In the computer 1000, programs can be installed in the recording block 1008 via the input/output interface 1005 by mounting the removable medium 1011 onto the drive 1010. Further, programs can be received by the communication block 1009 via a wired or wireless transmission medium so as to be installed in the recording block 1008. In addition, programs can be installed in the ROM 1002 or the recording block 1008 in advance.

Here, in the present description, the processing operations executed by the computer by following programs need not always be executed in time sequence along the order described in the flowchart. To be more specific, the processing operations to be executed by the computer by following programs also include processing operations that are executed in parallel or discretely (parallel processing operations or object processing operations, for example). In addition, programs may be processed by one unit of computer (one unit of a processor) or by two or more units of computers in a distribution processing manner.

It should be noted that the embodiment of the present technology are not limited to the embodiment described above and therefore changes and variations may be made to the embodiment without departing from the spirit of the present technology.

Furthermore, the present technology can take the following configurations.

(1)

A receiving apparatus including:
  a delay compensation block configured to delay, on the basis of time information included in a packet to be transmitted for each of a plurality of transmission paths including a broadcasting path, another packet to be transmitted by other transmission path than the reference transmission path with respect to a reference packet to be transmitted by a reference transmission path among the plurality of transmission paths to compensate a delay between the packets to be transmitted for each of the plurality of transmission paths.

(2)

The receiving apparatus according to (1) above, in which the delay compensation block has
  a measuring block configured to measure a delay amount between packets including time information indicative of a same time of the packets to be transmitted for each of the plurality of transmission paths, and
  a delay block configured to delay, as the other packet, a packet other than a most delayed packet as the reference packet of the packets including time information indicative of a same time by following a result of the measurement of the delay amount.

(3)

The receiving apparatus according to (1) or (2) above, in which
  the plurality of transmission paths are transmission paths for a plurality of frequency bands subject to channel bonding in which the plurality of frequency bands are linked for use.

(4)

The receiving apparatus according to (3) above, in which sending points from which a broadcast wave is sent are different for the plurality of frequency bands.

(5)

The receiving apparatus according to any one of (1) through (4) above, in which
  a delay that is compensated in the broadcasting path is a propagation delay according to a distance between a sending point from which a broadcast wave is sent and a receiving point at which the broadcast wave is received.

(6) The receiving apparatus according to (5) above, in which the delay that is compensated in the broadcasting path includes the propagation delay and a shift in time between sending facilities that send broadcast waves.

(7) The receiving apparatus according to (1) above, in which a delay that is compensated in the broadcasting path is a delay according to one of a parameter of a physical layer for transmitting a broadcast wave and installation of the receiving apparatus.

(8) The receiving apparatus according to (1) above, in which the plurality of transmission paths include a communication path in addition to the broadcasting path.

(9) The receiving apparatus according to any one of (1) through (8) above, in which the time information, included in a preamble of a packet to be processed by a physical layer, is indicative of a time at which the packet is processed.

(10) A data processing method for a receiving apparatus, including the steps of:
delaying by the receiving apparatus, on the basis of time information included in a packet to be transmitted for each of a plurality of transmission paths including a broadcasting path, another packet to be transmitted by other transmission path than the reference transmission path with respect to a reference packet to be transmitted by a reference transmission path among the plurality of transmission paths to compensate a delay between the packets to be transmitted for each of the plurality of transmission paths.

REFERENCE SIGNS LIST

1 . . . Transmission system, 10 . . . Sending apparatus, 20 . . . Receiving apparatus, 30 . . . Transmission path, 40-1, 40-2 . . . Sending station, 40-3 . . . Internet, 50 . . . Antenna, 60 . . . Server, 102 . . . Stream partitioner, 111-1, 111-2 . . . Physical layer processing block, 201-1, 201-2 . . . Physical layer processing block, 202-1, 202-2 . . . Buffer memory, 203 . . . Combination block, 211 . . . Propagation delay compensation block, 221 . . . Propagation delay amount measuring block, 222-1, 222-2, 222-3 . . . Delay block, 231, 231-1, 231-2 . . . Signal input block, 232, 232-1, 232-2 . . . Signal processing block, 233, 233-1, 233-2 . . . Signal output block, 1000 . . . Computer, 1001 . . . CPU

The invention claimed is:

1. A receiving apparatus comprising:
circuitry configured to:
wirelessly receive a plurality of broadcast packets respectively wirelessly transmitted via a plurality of transmission paths, the received plurality of broadcast packets including a first broadcast packet and a second broadcast packet, the first and second broadcast packets being associated with a same physical layer pipe (PLP), the first broadcast packet containing a first time information indicating a first time at which the first broadcast packet is sent from a first sending point, and the second broadcast packet containing a second time information indicating a second time at which the second broadcast packet is sent from a second sending point, the first broadcast packet being received by the receiving apparatus after the second broadcast packet, wherein the first time information and the second time information are indicative of the same time;
process the first and second packets;
determine a time difference between a time at which the first broadcast packet is processed and a time at which the second broadcast packet is processed; and
compensate the time difference by delaying further processing of the second broadcast packet based on the time difference.

2. The receiving apparatus according to claim 1, wherein each of the first and second time information is specified according to an absolute time protocol and is indicative of an absolute time at which each of the respective first and second broadcast packets was sent from each of the respective first and second sending points.

3. The receiving apparatus according to claim 2, wherein the absolute time protocol is a Precision Time Protocol (PTP) or a Network Time Protocol (NTP).

4. The receiving apparatus according to claim 1, wherein the plurality of transmission paths includes a plurality of broadcasting transmission paths in a plurality of frequency bands subject to channel bonding.

5. The receiving apparatus according to claim 4, wherein the channel bonding includes cell exchange between a first stream that includes the first packet and a second stream that includes the second packet.

6. The receiving apparatus according to claim 1, wherein the first and second broadcast packets are broadcast in different frequency bands.

7. The receiving apparatus according to claim 1, wherein compensating the time difference includes compensating at least a propagation delay between the first sending point from which the first broadcast packet is sent and a receiving point at which the first broadcast packet is received by the receiving apparatus, or between the second sending point from which the second broadcast packet is sent and the receiving point at which the second broadcast packet is received by the receiving apparatus.

8. The receiving apparatus according to claim 1, wherein compensating the time difference includes compensating a shift in sending timing between the first and the second sending points.

9. The receiving apparatus according to claim 1, wherein compensating the time difference includes compensating at least a signal delay caused by one of a parameter of a physical layer for transmitting the first or second broadcast packet or an installation of the receiving apparatus.

10. The receiving apparatus according to claim 1, wherein each of the plurality of broadcast packets is at least a portion of a physical layer frame of a broadcast signal.

11. The receiving apparatus according to claim 1, wherein:
each of the first and second broadcast packets includes a preamble,
the first time information is included in the preamble of the first broadcast packet, and
the second time information is included in the preamble of the second broadcast packet.

12. The receiving apparatus according to claim 1, wherein:
each of the first and second broadcast packets includes one or more baseband packets;

each of the baseband packets includes counter information indicative of a sequence of the baseband packets; and the circuitry is configured to process the baseband packets in accordance with the sequence.

13. The receiving apparatus according to claim 1, wherein the processing includes physical layer processing.

14. The receiving apparatus according to claim 1, wherein the further processing includes physical layer processing.

15. A data processing method for a receiving apparatus, the data processing method comprising:

wirelessly receiving, by circuitry of the receiving apparatus, a plurality of broadcast packets respectively wirelessly transmitted via a plurality of transmission paths, the received plurality of broadcast packets including a first broadcast packet and a second broadcast packet, the first and second broadcast packets being associated with a same physical layer pipe (PLP), the first broadcast packet containing a first time information indicating a first time at which the first broadcast packet is sent from a first sending point, and the second broadcast packet containing a second time information indicating a second time at which the second broadcast packet is sent from a second sending point, the first broadcast packet being received by the receiving apparatus after the second broadcast packet, wherein the first time information and the second time information are indicative of the same time;

processing the first and second packets;

determining a time difference between a time at which the first broadcast packet is processed and a time at which the second broadcast packet is processed; and compensating the time difference by delaying further processing of the second broadcast packet based on the time difference.

16. The data processing method according to claim 15, wherein each of the first and second time information is specified according to an absolute time protocol and is indicative of an absolute time at which each of the respective first and second broadcast packets was sent from each of the respective first and second sending points.

17. The data processing method according to claim 16, wherein the absolute time protocol is a Precision Time Protocol (PTP) or a Network Time Protocol (NTP).

18. The data processing method according to claim 15, wherein each of the plurality of broadcast packets is at least a portion of a physical layer frame of a broadcast signal.

19. The data processing method according to claim 15, wherein:

each of the first and second broadcast packets includes a preamble, the first time information is included in the preamble of the first broadcast packet, and the second time information is included in the preamble of the second broadcast packet.

20. The data processing method according to claim 15, wherein the plurality of transmission paths includes a plurality of broadcasting transmission paths in a plurality of frequency bands subject to channel bonding.

* * * * *